(12) United States Patent
Hendry et al.

(10) Patent No.: US 11,310,512 B2
(45) Date of Patent: *Apr. 19, 2022

(54) IMAGE DECODING METHOD AND APPARATUS USING SAME

(71) Applicant: LG ELECTRONICS INC., Seoul (KR)

(72) Inventors: Hendry Hendry, Seoul (KR);
Joonyoung Park, Seoul (KR);
Chulkeun Kim, Seoul (KR);
Byeongmoon Jeon, Seoul (KR);
Jungsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/085,889

(22) Filed: Oct. 30, 2020

(65) Prior Publication Data
US 2021/0105486 A1    Apr. 8, 2021

Related U.S. Application Data

(63) Continuation of application No. 16/674,150, filed on Nov. 5, 2019, now Pat. No. 10,855,994, which is a
(Continued)

(51) Int. Cl.
*H04N 19/00* (2014.01)
*H04N 19/159* (2014.01)
(Continued)

(52) U.S. Cl.
CPC ............ *H04N 19/159* (2014.11); *H04N 7/00* (2013.01); *H04N 19/105* (2014.11);
(Continued)

(58) Field of Classification Search
CPC ................................ H04N 7/00; H04N 19/00
See application file for complete search history.

(56) References Cited

U.S. PATENT DOCUMENTS

| 2014/0003537 | A1* | 1/2014 | Ramasubramonian ................... H04N 19/157 375/240.25 |
| 2014/0198857 | A1  | 7/2014 | Deshpande |
| 2015/0304671 | A1* | 10/2015 | Deshpande .......... H04N 19/423 375/240.12 |

FOREIGN PATENT DOCUMENTS

| JP | 2010-507277 A | 3/2010 |
| KR | 10-2009-0006094 A | 1/2009 |

(Continued)

OTHER PUBLICATIONS

Wang: "Spec text changes for JCTVC-K0126 based on JCTVC-K0030v2", JCTVC-K0126, Joint Collaborative Team on Video Coding (JCT-VC) of ITU-T SG16 WP3 and ISO/IEC JTC1/SC29/WG11, 11th Meeting, Shanghai, CN, Oct. 10-19, 2012.

(Continued)

*Primary Examiner* — Maryam A Nasri
(74) *Attorney, Agent, or Firm* — Dentons US LLP

(57) ABSTRACT

An image decoding method according to the present invention includes: receiving information on a set of reference pictures for configuring a set of reference pictures of a current picture, wherein the information on the set of reference pictures includes the most significant bit (MSB) information that may calculate the MSB of the picture order count (POC) of a long-term reference picture relative to the current picture, and flag information that represents whether there is MSB information; and eliciting the set of reference pictures by using received MSB information when the flag information is 1, and performing marking on the reference picture, wherein the flag information may be 1 when a (Continued)

temporal sub-layer identifier is 0, and there is at least one POC value for which a remainder obtained by dividing by a maximum value MaxPicOrderCntLsb capable of being represented by the LSB is the same as the least significant bit (LSB) of the POC of the long-term reference picture, in a set of POCs of a previous picture including POC values related to the previous picture that may not be discarded without affecting whether other pictures of the same temporal layer may be decoded.

16 Claims, 13 Drawing Sheets

Related U.S. Application Data continuation of application No. 16/182,060, filed on Nov. 6, 2018, now Pat. No. 10,516,886, which is a continuation of application No. 14/381,454, filed as application No. PCT/KR2013/010632 on Nov. 21, 2013, now Pat. No. 10,165,282.

(60) Provisional application No. 61/754,620, filed on Jan. 20, 2013, provisional application No. 61/753,868, filed on Jan. 17, 2013, provisional application No. 61/752,924, filed on Jan. 15, 2013, provisional application No. 61/752,410, filed on Jan. 14, 2013, provisional application No. 61/729,313, filed on Nov. 21, 2012.

(51) Int. Cl.
    *H04N 7/00*      (2011.01)
    *H04N 19/46*     (2014.01)
    *H04N 19/423*    (2014.01)
    *H04N 19/70*     (2014.01)
    *H04N 19/58*     (2014.01)
    *H04N 19/105*    (2014.01)
    *H04N 19/172*    (2014.01)
    *H04N 19/184*    (2014.01)

(52) U.S. Cl.
    CPC ......... *H04N 19/172* (2014.11); *H04N 19/184* (2014.11); *H04N 19/423* (2014.11); *H04N 19/46* (2014.11); *H04N 19/58* (2014.11); *H04N 19/70* (2014.11)

(56) References Cited

FOREIGN PATENT DOCUMENTS

| KR | 10-2011-0052203 A | 5/2011 |
| KR | 10-2011-0139304 A | 12/2011 |
| WO | 2012-096176 A1 | 7/2012 |

OTHER PUBLICATIONS

U.S. Appl. No. 16/182,060, filed Nov. 6, 2018 (U.S. Pat. No. 10,516,886).
U.S. Appl. No. 14/381,454, filed Aug. 27, 2014 (U.S. Pat. No. 10,165,282).
J. Samuelsson: "Single inclusion of long-term reference pictures in RPS", Joint Collaborative Team on Video Coding (JCT-VC) of ITU-T SG 16 WP 3 and ISO/IEC JTC 1/SC 29/WG 11, 11th Meeting, Shanghai, CN, Oct. 10-19, 2012.
Joint Collaborative Team on Video Coding (JCT-VC) of ITU-T SG 16 WP 3 and ISO/IEC JTC 1/SC 29/WG 11, "AHG13: on Signalling of MSB cycle for long-term reference pictures" Adarsh K. Ramasubramonian, 10th Meeting; Stockhold, SE, Jul. 11-20, 2012.
U.S. Appl. No. 14/381,454, filed Aug. 27, 2014.

\* cited by examiner

IMAGE DECODING METHOD AND APPARATUS USING SAME

This application is a Continuation of U.S. patent application Ser. No. 16/674,150, filed Nov. 5, 2019, which is a Continuation of U.S. patent application Ser. No. 16/182,060, filed Nov. 6, 2018, which is a continuation of U.S. patent application Ser. No. 14/381,454, filed Aug. 27, 2014, now U.S. Pat. No. 10,165,282, which is a National Stage Application of International Patent Application No. PCT/KR2013/010632, filed on Nov. 21, 2013, which claims the benefit of Provisional Application Nos. 61/729,313, filed on Nov. 21, 2012, 61/752,410 filed Jan. 14, 2013, 61/752,924 filed Jan. 15, 2013, 61/753,868 filed Jan. 17, 2013, and 61/54,620 filed Jan. 20, 2013, all of which are incorporated herein by reference in their entirety.

TECHNICAL FIELD

The present invention relates to a video compression technique, and more particularly, to a method and an apparatus for signaling reference picture list information.

BACKGROUND ART

Recently, demands for high-resolution and high-quality pictures have increased in various fields of applications. As pictures have higher resolution and higher quality, the amount of information on the pictures also increases.

With a growing amount of information, multi-functional devices and networks with various environments are introduced. Accordingly, the same content may be utilized with different levels of quality.

Specifically, as terminals are able to support diverse qualities of pictures and various network environments are established, a picture with general quality is enabled in one environment while a higher-quality picture may be available in another environment.

For example, a user may enjoy video content purchased through a portable terminal on a large-screen display with higher resolution at home.

In recent years, as high definition (HD) broadcast services are available, a large number of users are getting used to high-resolution and high-quality videos and service providers and service users also pay attention to ultrahigh-definition (UHD) services having a resolution four times higher than HDTV.

Thus, there is a need to provide scalability to video quality, for example, the image quality, resolution, size and frame rate of a video, based on high-efficiency encoding and decoding methods on a high-capacity video so as to offer varied qualities of video services in different environments for users❷ demands.

DISCLOSURE

Technical Problem

An aspect of the present invention is to provide a video decoding method capable of constructing a long-term reference picture set when a non-reference picture is discarded, and an apparatus using the same.

Another aspect of the present invention is to provide a video decoding method providing a condition for receiving LSB information for constructing a long-term reference picture set, and an apparatus using the same.

Technical Solution

An embodiment of the present invention provides a video decoding method that decodes a bit stream, the method including receiving reference picture set (RPS) information for constructing an RPS for a current picture, the RPS information comprising most significant bit (MSB) information for calculating an MSB of a picture order count (POC) of a long-term reference picture (LTRP) for the current picture and flag information indicating whether the MSB information is present; and deriving the RPS using the received MSB information and marking a reference picture when the flag information is 1, the flag information equal to 1 if there is more than one POC in a previous picture POC set comprising POCs relating to a previous picture that has a temporal sub-layer identifier equal to 0 and cannot be discarded without affecting decodability of another picture in the same temporal layer for which the POC modulo MaxPicOrderCntLsb is equal to an LSB of the POC of the LTRP, MaxPicOrderCntLsb is the max least significant bit (LSB) value.

A network abstraction layer (NAL) unit type of the previous picture may be none of TRAIL_N, TSA_N, STSA_N, RADL_N, RASL_N, RSV_VCL_N10, RSV_VCL_N12, and RSV_VCL_N14.

The previous picture may not be a sub-layer non-reference picture unavailable for inter prediction in decoding a next picture in decoding order in the same sub-layer.

The previous picture POC set may include a POC of the previous picture, a POC of each reference picture in an RPS for the previous picture, and a POC of each picture following the previous picture and preceding the current picture in decoding order.

The MSB information may be MSB cycle information determining a value corresponding to a difference in POC MSB between the current picture and the LTRP.

The method may further include constructing a POC list for deriving the RPS, wherein the POC list comprises a short-term reference picture (STRP) POC list comprising a POC of an STRP for the current picture and an LTRP POC list comprising the POC of the LTRP for the current picture, the STRP POC list is generated using a difference in POC between the current picture and the STRP, and the LTRP POC list is generated by an operation that is POC of current picture−DeltaPocMsbCycleLt*MaxPicOrderCntLsb−POC LSB of current picture+POC LSB of LTRP, DeltaPocMsb-CycleLt having a value corresponding to a difference in POC MSB between the current picture and the LTRP.

The deriving the RPS and marking the reference picture may include constructing an LTRP set using a picture with a POC LSB or POC the same as a POC in the LTRP POC list an when the picture is present in a decoded picture buffer (DPB) storing a reconstructed picture; marking all pictures in the LTRP set as "used for long-term reference;" constructing an STRP set using a picture with a POC the same as a POC in the STRP POC list when the picture is present in the DBP; and marking all reference pictures in the DPB which are not included on the LTRP set and the STRP set as "unused for reference."

The marking the reference picture may mark the reference picture as "unused for reference" or "used for long-term reference."

The method may include receiving slice type information on the current picture and prediction mode information on the current picture; determining based on the prediction mode information whether a prediction target block is subjected to intra prediction or inter prediction; deriving a reference picture list based on the RPS when inter prediction is applied to the prediction target block; deriving a predictive sample value of the prediction target block using the reference picture list; and generating a reconstructed picture based on the predictive sample value of the prediction target block.

The method may further include marking the reconstructed picture as "used for short-term reference."

Advantageous Effects

An embodiment of the present invention provides a video decoding method capable of constructing a long-term reference picture set when a non-reference picture is discarded, and an apparatus using the same.

Another embodiment of the present invention provides a video decoding method providing a condition for receiving LSB information for constructing a long-term reference picture set, and an apparatus using the same.

MODE FOR INVENTION

Figure 1:
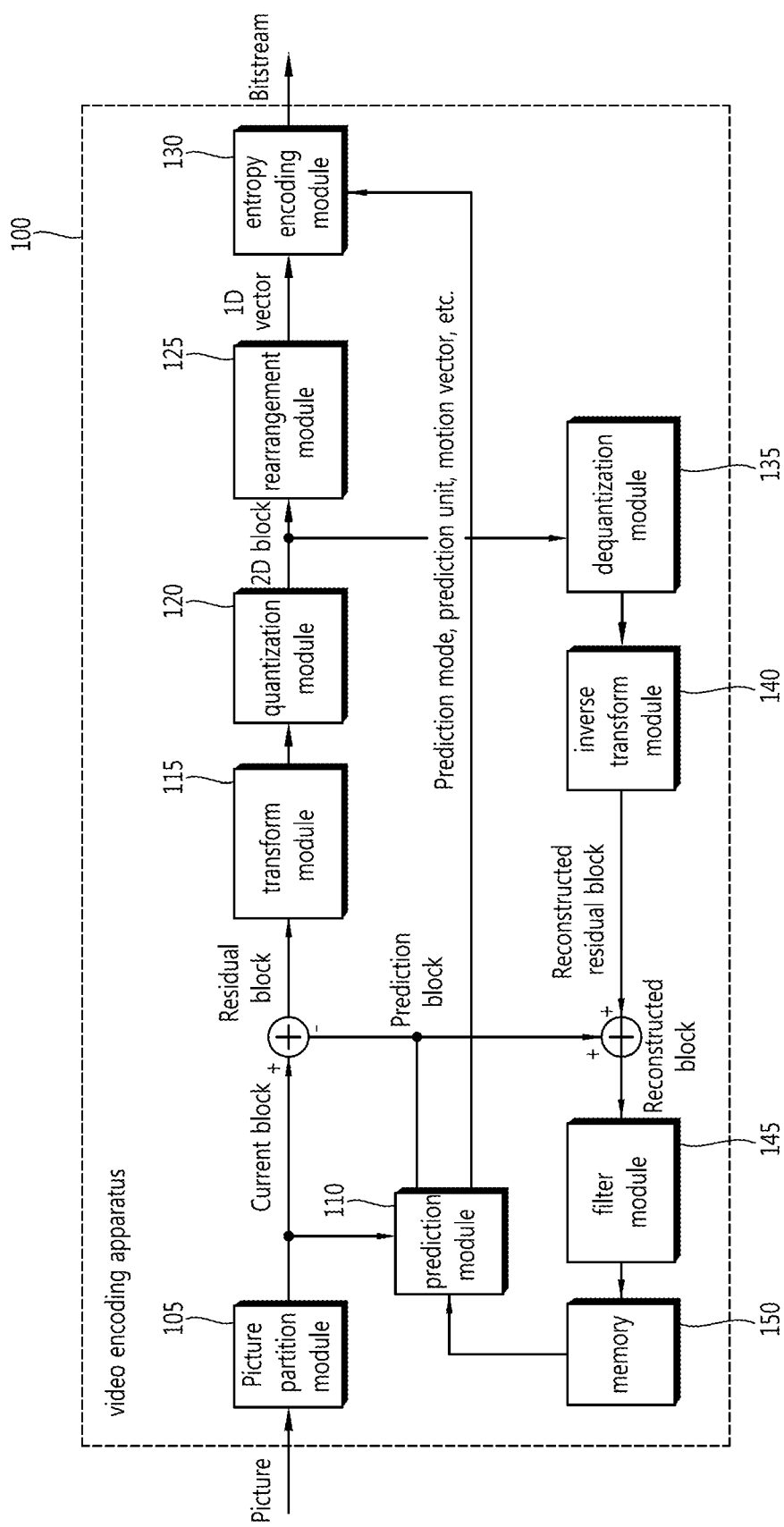
FIG. 1 is a block diagram schematically illustrating a video encoding apparatus according to an exemplary embodiment of the present invention.

The present invention may be changed and modified variously and be illustrated with reference to different exemplary embodiments, some of which will be described in detail and shown in the drawings. However, these embodiments are not intended for limiting the invention. The terminology used herein is for the purpose of describing particular embodiments only and is not intended to be limiting the technical idea of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components, and/or combinations thereof, but do not preclude the presence or addition of one or more other features, integers, steps, operations, elements, components, and/or combinations thereof.

Although elements illustrated in the drawings are independently shown for convenience of description of different distinctive functions in the video encoding apparatus/decoding apparatus, such a configuration does not indicate that each element is constructed by a separate hardware constituent or software constituent. That is, at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram schematically illustrating a video encoding apparatus according to an exemplary embodiment of the present invention. A scalable video encoding/decoding method or apparatus may be realized by extension of a general video encoding/decoding method or apparatus that does not provide scalability, and a scalable video encoding apparatus may be configured based on the video encoding apparatus FIG. 2.

Referring to FIG. 1, the video encoding apparatus 100 includes a picture partition module 105, a prediction module 110, a transform module 115, a quantization module 120, a rearrangement module 125, an entropy encoding module 130, a dequantization module 135, an inverse transform module 140, a filter module 145 and a memory 150.

The picture partition module 105 may divide an input picture into at least one block as a processing unit. Here, the block as the processing unit may be a prediction unit (PU), a transform unit (TU) or a coding unit (CU).

Processing unit blocks divided by the picture partition module 105 may have a quadtree structure.

The prediction module 110 may include an inter prediction module to perform inter prediction and an intra prediction module to perform intra prediction, which will be described. The prediction module 110 generates a prediction block by performing prediction on the processing unit of the picture from the partition module 105. The processing unit of the picture in the prediction module 110 may be a CU, a TU or a PU. Furthermore, the prediction module 110 may determine whether prediction performed on the processing unit is inter prediction or intra prediction, and may determine details (for example, a prediction mode) of each prediction method. Here, a processing unit for performing prediction may be different from a processing unit for determining a prediction method and details on the prediction method. For example, a prediction method and a prediction mode may be determined by PU, while prediction may be performed by TU.

In inter prediction, a prediction block may be generated by performing prediction based on information on at least one of previous and/or subsequent pictures of a current picture. In intra prediction, a prediction block may be generated by performing prediction based on information on a pixel within the current picture.

A skip mode, a merge mode or a motion vector prediction (MVP) mode may be used as an inter prediction method. In inter prediction, a reference picture for a PU may be selected, and a reference block corresponding to the PU may be selected. The reference block may be selected as a unit of inter pixel. Subsequently, a prediction block having a minimum residual signal from the current PU and a minimum-size motion vector is generated.

The prediction block may be generated as an integer sample unit or as a fractional pixel unit, such as a ½ pixel unit and a ¼ pixel unit. Here, the motion vector may be also represented in a fractional pixel.

Information including an index of the reference pixel selected in inter prediction, the motion vector (e.g., a motion vector predictor) and the residual signal, is entropy-encoded and transferred to a decoding apparatus. In the skip mode, since the prediction block may be a reconstructed block, the residual may not be generated, transformed, quantized and transferred.

In intra prediction, a prediction mode is determined by PU, and prediction may be performed by PU. Alternatively, a prediction mode may be determined by PU, and intra prediction may be performed in TU.

Intra prediction may include 33 directional prediction modes and two or more non-directional modes. The non-directional modes may include a DC prediction mode and a planar mode.

In intra prediction, the prediction block may be generated after applying a filter to a reference sample. Here, whether to apply the filter to the reference sample may be determined on an intra prediction mode and/or size of a current block.

A residual value (residual block or residual signal) between the generated prediction block and an original block is input to the transform module 115. Also, information on a prediction mode and a motion vector used for prediction are encoded along with the residual value by the entropy encoding module 130 and transferred to the decoding apparatus.

The transform module 115 transforms the residual block by a TU and generates a transform coefficient.

A transform block is a rectangular block of samples to which the same transformation is applied. The transform block may be a TU and have a quadtree structure.

The transform module 115 may perform transformation based on a prediction mode applied to the residual block and a size of the block.

For example, when intra prediction is applied to the residual block and the block has a 4×4 residual array, the transform module 115 may transform the residual block using discrete cosine transform (DCT). Otherwise, the transform module 115 may transform the residual block using discrete sine transform (DST).

The transform module 115 may generate a transform block of transform coefficients by transformation.

The quantization module 120 may quantize residual values transformed by the transform module 115, that is, the transform coefficients, to generate quantized transform coefficients. The coefficients generated by the quantization module 120 are provided to the dequantization module 135 and the rearrangement module 125.

The rearrangement module 125 rearranges the quantized transform coefficients provided by the quantization module 120. Rearranging the quantized transform coefficients may enhance encoding efficiency in the entropy encoding module 130.

The rearrangement module 125 may rearrange a two-dimensional (2D) block of the quantized transform coefficients into a one-dimensional (1D) vector using coefficient scanning.

The entropy encoding module 130 may entropy-encode symbols according to probability distribution based on the quantized transform coefficients rearranged by the rearrangement module 125 or encoding parameter values derived in coding, thereby outputting a bit stream. Entropy encoding is a method of receiving symbols having different values and representing the symbols as a decodable binary sequence or string while removing statistical redundancy.

Here, a symbol means a syntax element as an encoding/decoding target, a coding parameter, a value of a residual signal, or the like. A coding parameter, which is a parameter necessary for encoding and decoding, may include information encoded by the encoding apparatus and transferred to the decoding apparatus, such as a syntax element, and information to be inferred during an encoding or decoding process and means information necessary for encoding and decoding a picture. The coding parameter may include, for example, values or statistics of an intra/inter prediction mode, a movement/motion vector, a reference picture index, an encoding block pattern, presence or absence of a residual signal, a quantized transform parameter, a block size and block partition information. A residual signal may denote a difference between an original signal and a prediction signal, a signal obtained by transforming the difference between the original signal and the prediction signal, or a signal obtained by transforming and quantizing the difference between the original signal and the prediction signal. The residual signal may be referred to as a residual block in a block unit.

When entropy encoding is applied, symbols are represented such that a symbol having a high probability is allocated a small number of bits and a symbol having a low probability is allocated a large number of bits, thereby reducing a size of bit strings for symbols to be encoded. Accordingly, entropy encoding may enhance compression performance of video encoding.

For entropy encoding, encoding methods, such as exponential Golomb, context-adaptive variable length coding (CAVLC) and context-adaptive binary arithmetic coding (CABAC), may be used. For example, the entropy encoding module 130 may store a table used for performing entropy encoding, such as a variable length coding/code (VLC) table, and perform entropy encoding using the stored VLC table. In addition, the entropy encoding module 130 may derive a binarization method for a target symbol and a probability model for a target symbol/bin and perform entropy encoding using the derived binarization method or probability model.

Here, binarization means representing values of symbols as a bin sequence/string. A bin means each bin value (0 or 1) when a symbol is represented as a bin sequence/string through binarization.

A probability model means a predicted probability of a symbol/bin as an encoding/decoding target that may be derived through context information/context model. Context information/context model is information for determining a probability of a symbol/bin as an encoding/decoding target.

In more detail, CABAC as an entropy encoding method transforms a symbol that is not binarized into a bin by binarization, determines a context model using encoding information on a neighboring block and a block to be encoded or information on a symbol/bin encoded in a previous stage, and predicts a probability of a bin according to the determined context model to perform arithmetic encoding of the bin, thereby generating a bit stream. Here, CABAC may determine the context model, and then update the context model using information on an encoded symbol/bin for a context model for a next symbol/bin.

If necessary, the entropy encoding module 130 may make a modification to a received parameter set or syntax.

The dequantization module 135 dequantizes the values quantized by the quantization module 120, that is, the quantized transform coefficients, and the inverse transform module 140 inverse-transforms the values dequantized by the dequantization module 135.

The residual values generated through the dequantization module 135 and the inverse transform module 140 are merged with the prediction block predicted by the prediction module 110, thereby generating a reconstructed block.

FIG. 1 illustrates that a reconstructed block is generated by merging a residual block with a prediction block through an adder. Here, the adder may be regarded as a separate module for generating a reconstructed block (reconstructed block generation module).

The filter module 145 may apply a deblocking filter, an adaptive loop filter (ALF), and a sample adaptive offset (SAO) to a reconstructed picture.

The deblocking filter may remove block distortion generated on boundaries between blocks in the reconstructed picture. The ALF may perform filtering based on a value obtained by comparing the reconstructed picture obtained by filtering blocks using the deblocking filter with the original picture. The ALF may be employed only for high efficiency. The SAO reconstructs an offset difference between the residual block to which the deblocking filter has been applied and the original picture by a pixel unit, in which a band offset or an edge offset is used.

Meanwhile, the filter module 145 may not apply filtering to a reconstructed block used in inter prediction.

The memory 150 may store the reconstructed block or picture obtained via the filter module 145. The reconstructed block or picture stored in the memory 150 may be provided to the prediction module 110 performing inter prediction.

Figure 2:
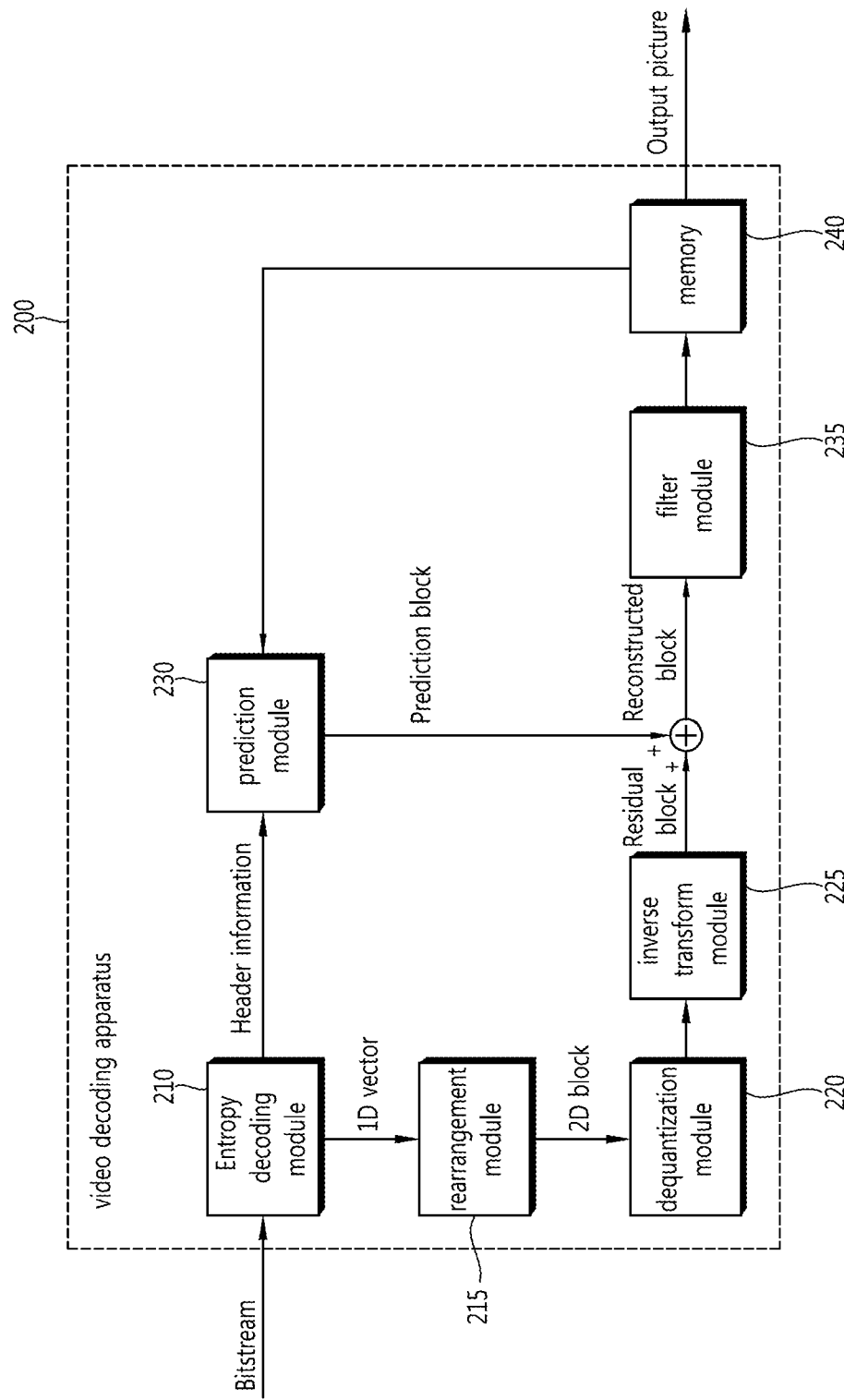
FIG. 2 is a block diagram schematically illustrating a video decoding apparatus according to an exemplary embodiment of the present invention.

FIG. 2 is a block diagram schematically showing a video decoding apparatus according to an exemplary embodiment of the present invention. As described above in FIG. 1, a scalable video encoding/decoding method or apparatus may be realized by extension of a general video encoding/decoding method or apparatus that does not provide scalability, and a scalable video decoding apparatus may be configured based on the video decoding apparatus FIG. 2.

Referring to FIG. 2, the video decoding apparatus 200 may include an entropy decoding module 210, a rearrangement module 215, an dequantization module 220, an inverse transform module 225, a prediction module 230, a filter module 235, and a memory 240.

When a video bit stream is input from the video encoding apparatus, the input bit stream may be decoded according to the same procedure for processing video information as used by the video encoding apparatus.

The entropy decoding module 210 entropy-decodes the input bit stream according to probability distribution to generate symbols including a symbol in a quantized coefficient form. Entropy decoding is a method of receiving a binary sequence or string and generating each symbol. Entropy decoding is similar to entropy encoding described above.

For example, if the video encoding apparatus uses variable length coding (VLC), such as CAVLC, to perform entropy encoding, the entropy decoding module 210 may perform entropy decoding by configuring the same VLC table as used in the encoding apparatus. Furthermore, if the video encoding apparatus uses CABAC to perform entropy ending, the entropy decoding module 210 may also perform entropy decoding using CABAC.

In more detail, CABAC as an entropy decoding method may receive a bin corresponding to each syntax element in the bit stream, determines a context model using information on a syntax element to be decoded and decoding information on a neighboring block and a block to be decoded or information on a symbol/bin decoded in a previous stage, and predict a probability of a bin according to the determined context model to perform arithmetic decoding of the bin, thereby generating a symbol corresponding to a value of each syntax element. Here, CABAC may determine the context model, and then update the context model using information on a decoded symbol/bin for a context model for a next symbol/bin.

When entropy decoding is applied, symbols are represented such that a symbol having a high probability is allocated a small number of bits and a symbol having a low probability is allocated a large number of bits, thereby reducing a size of bit strings for symbols to be encoded. Accordingly, entropy decoding may enhance compression performance of video decoding.

Information for generating a prediction block, among pieces of information decoded by the entropy decoding module 210, may be provided to the prediction module 230. Residual values entropy-decoded by the entropy decoding module 210, that is, quantized transform coefficients, may be input to the rearrangement module 215.

The rearrangement module 215 may rearrange information on the bit stream entropy-decoded by the entropy decoding module 210, that is, the quantized transform coefficients, based on a rearrangement method used in the encoding apparatus.

The rearrangement module 215 may reconstruct and rearrange a 1D vector of coefficients into a 2D block of coefficients. The rearrangement module 215 may scan coefficients based on a prediction mode of a current block (transform block) and a size of the transform block to generate a 2D block of coefficients (quantized transform coefficients).

The dequantization module 220 may perform dequantization based on a quantization parameter provided from the encoding apparatus and the rearranged coefficients of the block.

The inverse transform module 225 may perform inverse DCT and/or inverse DST on a result of quantization performed by the video encoding apparatus in response to DCT and DST performed by the transform module of the encoding apparatus.

Inverse transformation may be performed on the basis of a transfer unit or a partition unit of a picture determined by the video encoding apparatus. The transform module of the video encoding apparatus may selectively perform DCT and/or DST depending on a plurality of information elements, such as a prediction method, a size of the current block and a prediction direction, and the inverse transform module 225 of the video decoding apparatus may perform inverse transformation on the basis of information on the transformation performed by the transform module of the video encoding apparatus.

The prediction module 230 may generate a prediction block based on information on generation of the prediction block provided from the entropy decoding module 210 and information on a previously decoded block and/or picture provided by the memory 240.

When a prediction mode for a current PU is an intra prediction mode, intra prediction may be performed based on information on a pixel in a current picture to generate the prediction block.

When a prediction mode for the current PU is an inter prediction mode, inter prediction for the current PU may be performed based on information on at least one of previous and subsequent pictures of the current picture. Here, motion information necessary for the inter prediction for the current PU provided by the video encoding apparatus, for example, information on a motion vector and a reference picture index, may be derived by checking a skip flag and a merge flag received from the encoding apparatus.

In inter prediction for the current picture, the prediction block with a minimum residual signal from the current block and a minimum-size motion vector may be generated.

Meanwhile, methods of deriving motion information may vary according to a prediction mode of the current block. An advanced motion vector predictor (AMVP) mode, a merge mode, or the like may be used as a prediction mode for inter prediction.

For example, when the AMVP mode is employed, the encoding apparatus and the decoding apparatus may generate a motion vector candidate list by using a motion vector of the reconstructed neighboring block and/or a motion vector of the collocated block. That is, the motion vector of the reconstructed neighboring block and/or the motion vector of the collocated block may be used as motion vector candidates. The encoding apparatus may transmit a prediction motion vector index indicating an optimal motion vector selected among the motion vector candidates included in the list to the decoding apparatus. In this case, the decoding apparatus may select a prediction motion vector of the current block, using the motion vector index, among the motion vector candidates included in the motion vector candidate list.

The encoding apparatus may calculate a motion vector difference (MVD) between a motion vector of the current block and the prediction motion vector, encode the MVD and transmit the MVD to the decoding apparatus. Here, the decoding apparatus may decode the received MVD and add the MVD to the prediction motion vector to obtain the motion vector of the current block.

The encoding apparatus may also transmit the reference picture index indicating the reference picture to the decoding apparatus.

The decoding apparatus may predict the motion vector of the current block using motion information on neighboring blocks and derive the motion vector of the current block using a residual received from the encoding apparatus. The decoding apparatus may generate the prediction block for the current block based on the derived motion vector and information of the reference picture index received from the encoding apparatus.

Alternatively, when the merge mode is employed, the encoding apparatus and the decoding apparatus may generate a merge candidate list using motion information on the reconstructed neighboring block and/or motion information on the collocated block. That is, when the motion information on the reconstructed neighboring block and/or on the collocated block is present, the encoding apparatus and the decoding apparatus may use the motion information as a merge candidate for the current block.

The encoding apparatus may select a merge candidate which provides optimal coding efficiency among merge candidates included in the merge candidate list as motion information for the current block. In this case, a merge index indicating the selected merge candidate may be included in a bit stream to be transmitted to the decoding apparatus. The decoding apparatus may select one of the merge candidates included in the merge candidate list using the transmitted merge index and determine the selected merge candidate as the motion information for the current block. Thus, when the merge mode is employed, the motion information on the reconstructed neighboring block and/or on the collocated block may be used as the motion information for the current block as it is. The decoding apparatus may reconstruct the current block by adding the prediction block to the residual transmitted from the encoding apparatus.

In the aforementioned AMVP and merge modes, the motion information on the reconstructed neighboring block and/or motion information on collocated block may be used in order to derive the motion information on the current block.

In the skip mode as another mode used for inter prediction, information on a neighboring block may be used for the current block as it is. Accordingly, in the skip mode, the encoding apparatus does not transmit syntax information, such as a residual, to the decoding apparatus, except for information indicating which block motion information to be used as the motion information on the current block.

The encoding apparatus and the decoding apparatus may perform motion compensation on the current block based on the derived motion information, thereby generating the prediction block of the current block. Here, the prediction block may refer to a motion-compensated block generated by performing motion compensation on the current block. Further, a plurality of motion-compensated blocks may form one motion-compensated picture.

A reconstructed block may be generated using the prediction block generated by the prediction module 230 and the residual block provided by the inverse transform module 225. FIG. 2 illustrates that the reconstructed block is generated by the adder merging the prediction block with the residual block. Here, the adder may be regarded as a separate module for generating the reconstructed block (reconstructed block generation module).

When the skip mode is used, the prediction block may be the reconstructed block without transmitting the residual block.

The reconstructed block and/or picture may be provided to the filter module 235. The filter module 235 may apply deblocking filtering, SAO and/or AFL to the reconstructed block and/or picture.

The memory 240 may store the reconstructed picture or block to be used as a reference picture or a reference block and supply the reconstructed picture to an output unit.

Components directly related to video decoding among the entropy decoding module 210, the rearrangement module 215, the dequantization module 220, the inverse transform module 225, the prediction module 230, the filter module 235 and the memory 240 of the decoding apparatus 200, for example, the entropy decoding module 210, the rearrangement module 215, the dequantization module 220, the inverse transform module 225, the prediction module 230 and the filter module 235 may be defined as a decoder or a decoding unit, separately from the other components.

Further, the decoding apparatus 200 may further include a parsing module (not shown) to parse information about an encoded video included in the bit stream. The parsing module may include the entropy decoding module 210 or be included in the entropy decoding module 210. The parsing module may be provided as one component of the decoding unit.

Figure 3:
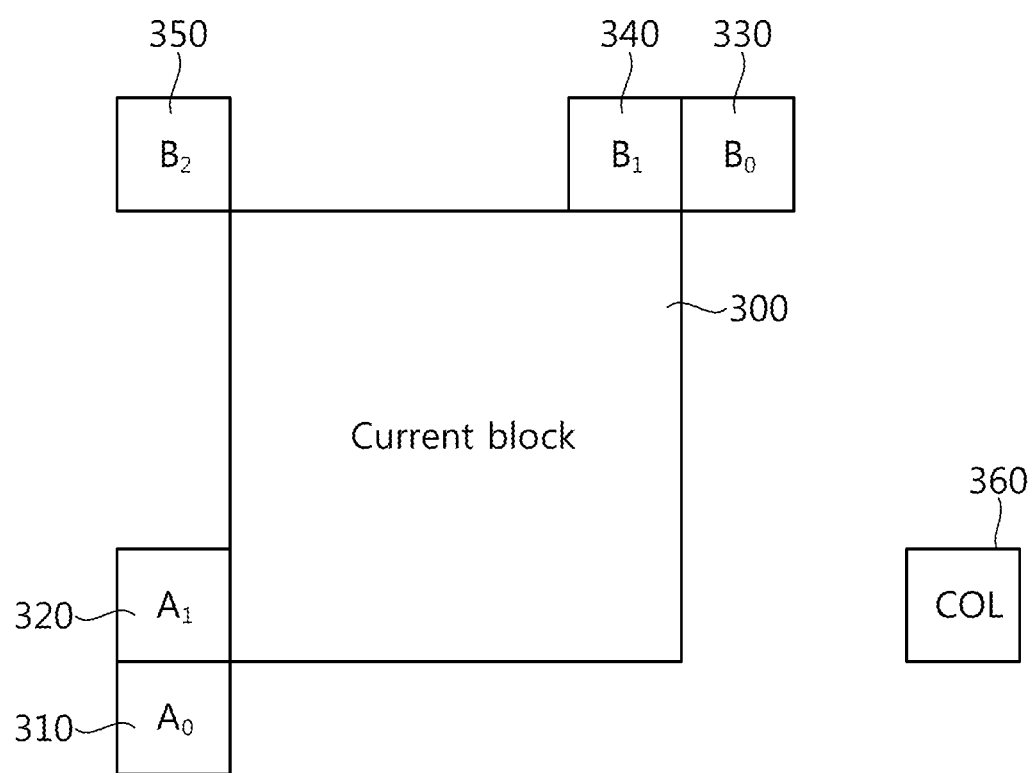
FIG. 3 schematically illustrates a candidate block available when inter prediction is performed on a current block according to an exemplary embodiment.

FIG. 3 schematically illustrates a candidate block available when inter prediction is performed on a current block according to an exemplary embodiment.

The prediction modules of the encoding apparatus and the decoding apparatus may use a block at a preset position neighboring a current block 300 as a candidate block. Referring to FIG. 3 as an example, two blocks $A_0$ 310 and $A_1$ 320 at bottom left positions of the current block and three blocks $B_0$ 330, $B_1$ 340 and $B_2$ 350 at top right and top left positions of the current block may be selected as spatial candidate blocks. In addition to the spatially neighboring blocks, a COL block 360 may be used as a temporal candidate block. The COL block 360 may be a block in a reconstructed collocated (col) picture spatially corresponding to the current block or a block present at a predetermined relative position (position inside and/or outside the block spatially corresponding to the current block) in the reconstructed collocated (col) picture.

In inter prediction, prediction of the current block may be performed based on a reference picture, which is at least one of previous and subsequent pictures of a current picture. A picture used for generating a prediction block of the current block, that is, for prediction of the current block is referred to as a reference picture or reference frame.

A reference picture for the current block may be derived from a reference picture for a neighboring block or indicated by information received from the encoding apparatus. In the skip mode or merge mode, the prediction module of the decoding apparatus may use the reference picture for the neighboring block as the reference picture for the current picture. When the MVP mode is applied, the prediction module of the decoding apparatus may receive information indicating the reference picture for the current block from the encoding apparatus.

The reference picture is specified by a reference picture index refIdx, and a predetermined region in the reference picture is specified by a motion vector.

Pictures encoded/decoded prior to a current picture may be stored in a memory, for example, a decoded picture buffer (DPB), and be used for prediction of the current block or current picture. Pictures available for inter prediction of the current block may be maintained in a reference picture list. Here, a reference picture used for inter prediction of the current block among the reference pictures included in the reference picture list may be indicated by a reference picture index. That is, the reference picture index may refer to an index indicating the reference picture used for inter prediction of the current block among the reference pictures forming the reference picture list.

A P slice is a slice decoded by intra prediction or by inter prediction using at most one motion vector and one reference picture. A B slice is a slice decoded by intra prediction or by inter prediction using at most two motion vectors and two reference pictures. Here, the reference pictures may include short-term reference pictures (STRPs) and long-term reference pictures (LTRPs). Pictures may be specified by Picture Order Count (POC) which represents display order, in which STRPs may be pictures having an small difference in POC from the current picture and LTRPs may be pictures having a large difference in POC from the current picture. Hereinafter, POC may be used to include a POC value.

Reference picture list 0 ("L0") is a reference picture list used for inter prediction of a P slice or B slice. Reference picture list 1 ("L1") is used for inter prediction of a B slice. Thus, L0 is used for inter prediction of a block of a P slice involved in unidirectional prediction, while L0 and L1 are used for inter prediction of a block of a B slice involved in bidirectional prediction.

The reference picture list may be constructed based on a reference picture set (RPS) determined or generated by the encoding apparatus and the decoding apparatus. An RPS refers to an available reference picture present in a decoding memory, for example in the DPB, for decoding a slice or picture. Information relating to an RPS needed for decoding a slice (and/or picture) may be transmitted through a sequence parameter set (SPS), a picture parameter set (PPS) and/or a slice header.

The RPS may include reference pictures used for reference for the current picture/slice or a future picture/slice. Reference pictures used for decoding a slice and/or picture may include STRPs and LTRPs. Further, STRPs may include forward STRPs having a lower POC than that of the current picture and backward STRPs having a higher POC than that of the current picture. Here, an RPS may be determined or generated with respect to each of forward STRPs, backward STRPs and LTRPs.

To identify STRPs, differences in POC between the current picture and the STRPs are signaled. For an LTRP, a least significant bit (LSB) of a POC of the LTRP is signaled.

When an LTRP is signaled through a slice header, if at least two reference pictures having the same POC LSB are present in the DPB, one of which is an LTRP, additional information for determining a most significant bit (MSB) of a POC of the LTRP may need to be signaled for clear signaling.

Meanwhile, before decoding a slice, five lists including POC values may need constructing to derive an RPS. The five lists include PocStCurrBefore, PocStCurrAfter, PocStFoll, PocLtCurr and PocLtFoll. The lists may include numbers of components, that is, POC values, the numbers being specified by NumPocStCurrBefore, NumPocStCurrAfter, NumPocStFoll, NumPocLtCurr and NumPocLtFoll, respectively.

The lists are described in brief as below.

(1) PocStCurrBefore: A list including a POC of an STRP which is used by the current picture and has a smaller POC than that of the current picture (2) PocStCurrAfter: A list including a POC of an STRP that is used by the current picture and has a larger POC than that of the current picture (3) PocStFoll: A list including a POC of an STRP not used by the current picture (4) PocLtCurr: A list including a POC of an LTRP that is used by the current picture Here, when no MSB information is signaled, for example, delta_poc_msb_present_flag is 0, a POC listed in PocLtCurr corresponds only to an LSB of a POC of a reference picture.

delta_poc_msb_present_flag is flag information indicating whether delta_poc_msb_cycle_lt[i] is present, and delta_poc_msb_cycle_lt[i] is a value for determining DeltaPocMsbCycleLt used for calculating a POC MSB of an LTRP in a long-term reference picture set (LTRPS) of the current picture. DeltaPocMsbCycleLt may correspond to a difference between an MSB of the POC of the current picture and an MSB of a POC of a reference picture.

(5) PocLtFoll: A list including a POC of an LTRP not used by the current picture Here, when no MSB information is signaled, for example, delta_poc_msb_present_flag [i] is 0, a POC listed in PocLtFoll corresponds only to an LSB of a POC of a reference picture.

Based on the foregoing information, a process of deriving an RPS and marking a picture may be carried out as follows. Each reference picture is derived as components for an RPS and marked via an iterative specific process corresponding to a number of reference pictures.

Hereinafter, for convenience of description, a reference picture set of forward STRPs is defined as a forward STRP set ("STRPS"), a reference picture set of backward STRPs as a backward STRP set ("STRPS"), and a reference picture set of LTRPs as an LTRP set ("LTRPS"). For example, the forward STRPS may be represented as RefPicSetStCurrBefore, the backward STRPS as RefPicSetStCurrAfter, and the LTRPS as RefPicSetLtCurr.

Further, an STRPS not used by the current picture may be represented as RefPicSetStFoll, and an LTRPS not used by the current picture as RefPicSetLtFoll.

```
1. An LTRPS is derived first, and an LTRP is marked.
for( i = 0; i < NumPocLtCurr; i++ )↓
    if( !CurrDeltaPocMsbPresentFlag[ i ] )↓
        if( there is a long-term reference picture picX in the DPB↓
                with pic_order_cnt_lsb equal to PocLtCurr[ i ] )↓
            RefPicSetLtCurr[ i ] = picX↓
        else if( there is a short-term reference picture picY in the DPB↓
                with pic_order_cnt_lsb equal to PocLtCurr[i] )↓
            RefPicSetLtCurr[ i ] = picY↓
        else↓
            RefPicSetLtCurr[ i ] = "no reference picture"↓
    else↓
        if( there is a long-term reference picture picX in the DPB↓
                with PicOrderCntVal equal to PocLtCurr[ i ] )↓
            RefPicSetLtCurr[ i ] = picX↓
        else if( there is a short-term reference picture picY in the DPB↓
                with PicOrderCntVal equal to PocLtCurr [ i ] )↓
            RefPicSetLtCurr[ i ] = picY↓
        else↓
            RefPicSetLtCurr[ i ] = "no reference picture"←
for( i = 0; i < NumPocLtFoll; i++ )↓
    if( !FollDeltaPocMsbPresentFlag[ i ] ) ↓
        if( there is a long-term reference picture picX in the DPB↓
                with pic_order_cnt_lsb equal to PocLtFoll[ i ] )↓
            RefPicSetLtFoll[ i ] = picX↓
        else if( there is a short-term reference picture picY in the DPB↓
                with pic_order_cnt_lsb equal to PocLtFoll [ i ] )↓
            RefPicSetLtFoll[ i ] = picY↓
        else↓
            RefPicSetLtFoll[ i ] = "no reference picture"↓
    else↓
        if( there is a long-term reference picture picX in the DPB↓
                with PicOrderCntVal equal to PocLtFoll[ i ] )↓
            RefPicSetLtFoll[ i ] = picX↓
        else if( there is a short-term reference picture picY in the DPB↓
                with PicOrderCntVal equal to PocLtFoll[ i ] )↓
            RefPicSetLtFoll[ i ] = picY↓
        else↓
            RefPicSetLtFoll[ i ] = "no reference picture"←
```

2. All reference pictures included in RefPicSetLtCurr and RefPicSetLtFoll are marked as "used for long-term reference," that is, "used as LTRPs."

3. Subsequently, an STRPS is derived, and an STRP is marked.

```
for( i = 0; i < NumPocStCurrBefore;i++ )↓
    if( there is a short-term reference picture picX in the DPB↓
            with PicOrderCntVal equal to PocStCurrBefore[I ])↓
        RefPicSetStCurrBefore[i] = picX↓
    else↓
        RefPicSetStCurrBefore[I ] = "no reference picture"
for( i = 0; i < NumPocStCurrAfter;i++)↓
    if(there is a short-term reference picture picX in the DPB↓
            with PicOrderCntVal equal to PocStCurrAfter[i])↓
```

-continued

```
        RefPicSetStCurrAfter[ i ] = picX↓
    else↓
        RefPicSetStCurrAfter[ i ] = "no reference picture"←
for( i = 0; i < NumPocStFoll; i++ )↓
    if( there is a short-term reference picture picX in the DPB↓
            with PicOrderCntVal equal to PocStFoll[ i ])↓
        RefPicSetStFoll[ I ] = picX↓
    else↓
        RefPicSetStFoll[ i ] = "no reference picture"←
```

4. All reference pictures present in the DPB, not included in RefPicSetLtCurr, RefPicSetLtFoll, RefPicSetStCurrBefore, RefPicSetStCurrAfter or RefPicSetStFoll are marked as "unused for reference," that is, "unused as reference pictures."

Figure 4:
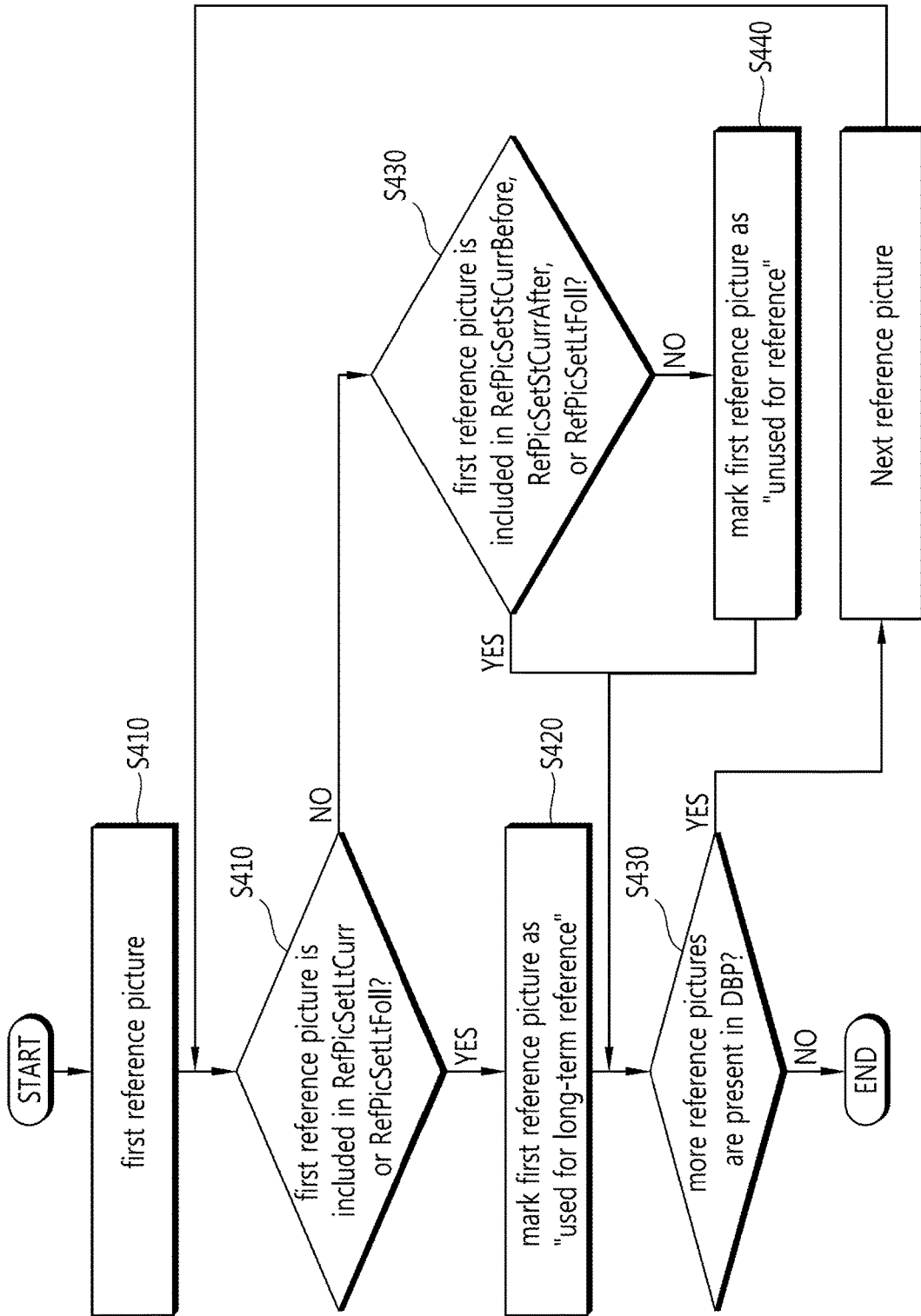
FIG. 4 is a flowchart illustrating a process of marking a reference picture marking.

FIG. 4 is a flowchart illustrating a reference picture marking process. Each reference picture in the DPB is subjected to the following process.

First, it is checked whether a picture to be marked as a reference picture, that is, a first reference picture, is included in an LTRPS RefPicSetLtCurr or in a non-reference LTRPS RefPicSetLtFoll. The non-reference LTRPS is not referred to by a current (S410).

If the first reference picture is included in RefPicSetLtCurr or RefPicSetLtFoll, the first reference picture is marked as "used for long-term reference" (S420), followed by operation S450.

If the first reference picture is not included in RefPicSetLtCurr and RefPicSetLtFoll, operation S430 is carried out.

It is checked whether the first reference picture is included in a forward STRP set RefPicSetStCurrBefore, in a backward STRP set RefPicSetStCurrAfter, or in a non-reference STRP set RefPicSetLtFoll (S430).

If the first reference picture is not included in the forward STRP set, in the backward STRP set, and in the non-reference STRP, the first reference picture is marked as "unused for reference" (S440), followed by operation S450.

If the first reference picture is included in the forward STRP set, in the backward STRP set, or in the non-reference STRP, operation S450 is carried out.

In operation S450, it is determined whether more reference pictures are present in the DPB, and if additional reference pictures are present in the DPB, a next reference picture as a reference picture marking target is subjected to the foregoing process to start operation S410.

If a reference picture to be marked as a reference picture is not present, the reference picture marking process terminates.

The foregoing process of deriving and marking a reference picture set involves a robustness problem. That is, when deriving an RPS, such as RefPicSetLtCurr, RefPicSetLtFoll, RefPicSetStCurrBefore, RefPicSetStCurrAfter and RefPicSetStFoll, and marking a state of a reference picture in the DPB, the foregoing process may be inappropriate under a particular situation.

Figure 5:
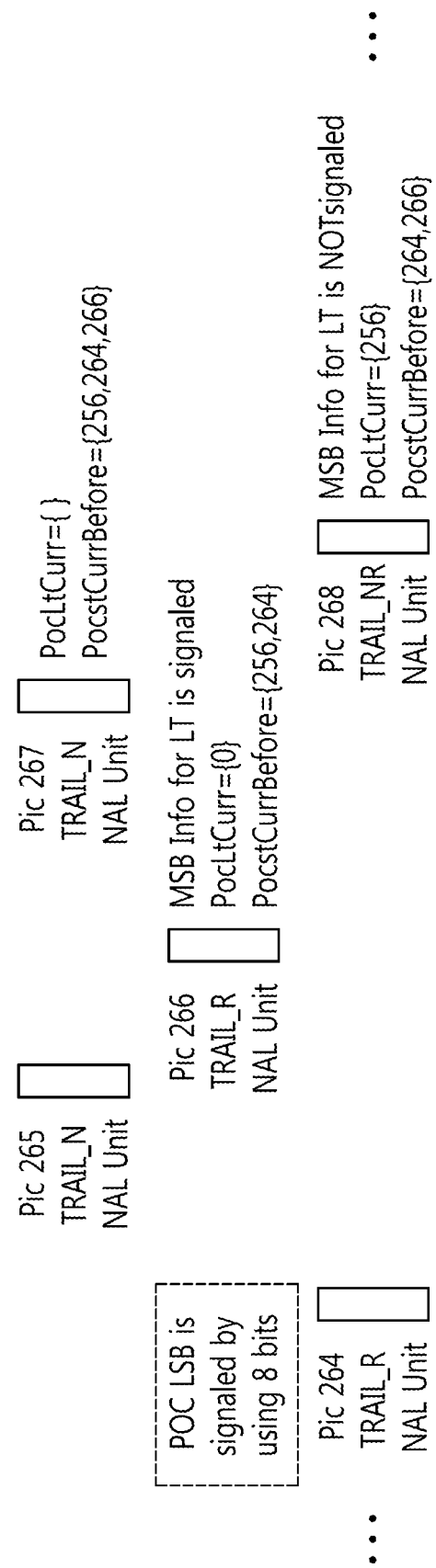
FIG. 5 illustrates a process of deriving and marking a reference picture set (RPS) according to one exemplary embodiment.

FIG. 5 illustrates a process of deriving and marking an RPS according to one exemplary embodiment. Referring to FIG. 5, pictures may be classified into reference pictures and non-reference pictures. The reference pictures are packetized into a TRAIL_R NAL unit, and the non-reference pictures are packetized into a TRAIL_N NAL unit.

A temporal sub-layer access (TSA) picture as a TSA NAL unit type is a picture which is switchable between temporal sub-layers in a bit stream supporting temporal scalability, indicating an up-switchable position from a lower sub-layer to an upper sub-layer.

A step-wise temporal sub-layer access (STSA) picture as an STSA NAL unit type is a picture which is switchable between temporal sub-layers in a bit stream supporting temporal scalability, indicating an up-switchable position from a lower sub-layer to a one-level higher upper sub-layer.

A TRAIL picture as a TRAIL NAL unit type is a picture following a randomly accessible picture in an output order and decoding order.

As shown in FIG. 5, an NAL unit type, which represents a property of a picture, may be marked with whether the picture is referenced by a different picture. A picture with an NAL unit type marked as "_N" refers to a non-reference picture that a different picture does not refer to, and a picture with an NAL unit type marked as "_R" refers to a reference picture that a different picture refers to.

When an NAL unit type is TRAIL_N, TSA_N or STSA_N, a decoded picture may not be included in any of RefPicSetStCurrBefore, RefPicSetStCurrAfter and RefPicSetLtCurr of pictures having the same temporal sub-layer ID (TemporalId).

That is, a coding picture with an NAL unit type of TRAIL_N, TSA_N or STSA_N may be discarded, without affecting decoding of pictures with the same temporal sub-layer ID (TemporalId).

Referring to FIG. 5, a picture having a POC of 264 ("Pic 264"), a picture having a POC of 266 ("Pic 266") and a picture having a POC of 268 ("Pic 268") have an NAL unit type of TRAIL_R and thus may be referenced by a different picture. A picture having a POC of 265 ("Pic 265") and a picture having a POC of 267 ("Pic 267") have an NAL unit type of TRAIL_N and thus may be non-referenced by another picture.

Suppose that when a first slice of Pic 266 is received, an LTRP having a POC of 0 ("Pic 0") and three STRPs having POCs of 252, 256 and 264 ("Pic 252," "Pic 256" and "Pic 264") are present in the DPB. When Pic 266, Pic 267 and Pic 268 are received, a process of deriving an RPS and marking a picture is as follows.

1. For Pic 266, an RPS is derived and a reference picture is marked as follows. Here, since the DPB includes pictures having the same POC LSB, for example, Pic 0 and Pic 256, a slice header necessarily signals MSB information on the LTRP. As an LSB of a POC is signaled using 8 bits, Pic 0 and Pic 256 have the same POC LSB.
RefPicSetLtCurr={0}←
RefPicSetLtFoll={ }←
RefPicSetStCurrBefore={256, 264}←
RefPicSetStCurrAfter={ }←
RefPicSetStFoll={ }←
State of DPB:←
   Reference picture with POC 0 is marked as "used for long-term reference"←
   Reference picture with POC 256 is marked as "used for short-term reference"←
   Reference picture with POC 264 is marked as "used for short-term reference"←
   Reference picture with POC 252 is marked as "unused for reference"←

2. For Pic 267, an RPS is derived and a reference picture is marked as follows.
RefPicSetLtCurr={ }←
RefPicSetLtFoll={ }←
RefPicSetStCurrBefore={256, 264, 266}←
RefPicSetStCurrAfter={ }←
RefPicSetStFoll={ }←
State of DPB:←
   Reference picture with POC 256 is marked as "used for short-term reference"←
   Reference picture with POC 264 is marked as "used for short-term reference"←
   Reference picture with POC 266 is marked as "used for short-term reference"←
   Reference picture with POC 0 is marked as "unused for reference"←

3. For Pic 268, an RPS is derived and a reference picture is marked as follows. Here, since the DPB includes only a single picture with a POC LSB of 0, the slice header may not need to signal the MSB information on the LTRP.
RefPicSetLtCurr={256}←
RefPicSetLtFoll={ }←
RefPicSetStCurrBefore={264, 266}←
RefPicSetStCurrAfter={ }←
RefPicSetStFoll={ }←
State of DPB:←
   Reference picture with POC 256 is marked as "used for long-term reference"←
   Reference picture with POC 264 is marked as "used for short-term reference"←
   Reference picture with POC 266 is marked as "used for short-term reference"←

Figure 6:
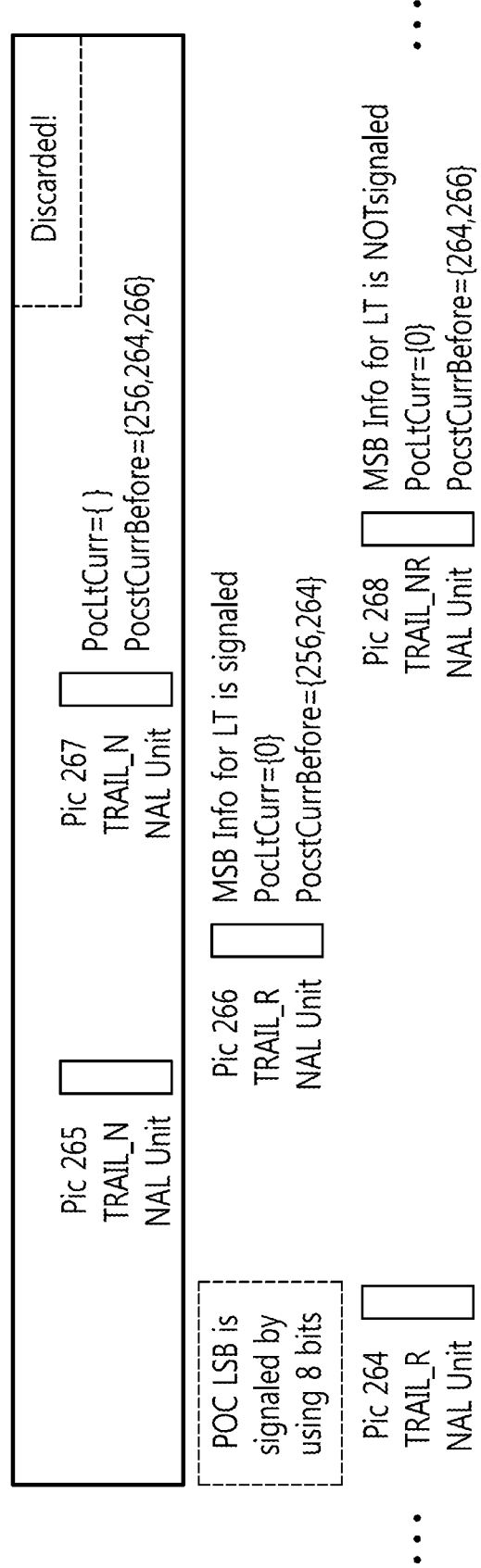
FIG. 6 illustrates a process of deriving and marking an RPS when a non-reference picture is discarded.

FIG. 6 illustrates a process of deriving and marking an RPS when a non-reference picture is discarded.

FIG. 6 shows that the non-reference pictures Pic 265 and Pic 267 having the NAL unit type of TRAIL_N are discarded under the same condition as in FIG. 5. FIG. 6 involves mismatches in the process of deriving and marking the RPS.

When the non-reference pictures are discarded, a process of deriving an RPS and marking a picture is as follows when Pic 266 and Pic 268 are received.

1. For Pic 266, an RPS is derived and a reference picture is marked as follows, in which case no problem occurs.
RefPicSetLtCurr={0}
RefPicSetLtFoll={ }
RefPicSetStCurrBefore={256, 264}←
RefPicSetStCurrAfter={ }
RefPicSetStFoll={ }←
State of DPB:←
   Reference picture with POC 0 is marked as "used for long-term reference"←
   Reference picture with POC 256 is marked as "used for short-term reference"←
   Reference picture with POC 264 is marked as "used for short-term reference"←
   Reference picture with POC 252 is marked as "unused for reference"←

2. For Pic 268, an RPS is derived and a reference picture is marked as follows.
RefPicSetLtCurr={0}
RefPicSetLtFoll={ }←
RefPicSetStCurrBefore={264, 266}←
RefPicSetStCurrAfter={ }←
RefPicSetStFoll={ }←
State of DPB:←
   Reference picture with POC 0 is marked as "used for long-term reference"←
   Reference picture with POC 264 is marked as "used for short-term reference"←
   Reference picture with POC 266 is marked as "used for short-term reference"←

Reference picture with POC 256 is marked as "unused for reference"←

When deriving the RPS for Pic 268, a problem occurs. Although the reference picture with the POC of 256 is initially intended to be marked as "used for long-term reference," the reference picture with the POC of 256 is marked as "unused for reference" as illustrated above.

As in FIG. 6, when Pic 267 is discarded, information indicating that the reference picture with the POC of 0 is marked as "unused for reference" and the reference picture is necessarily discarded is not transmitted. Thus, the reference picture with the POC of 0 remains in the DPB until a process of marking a next picture. Since the reference picture with the POC of 0 remains in the DPB, pictures having the same POC LSB, that is, the reference pictures with the POCs of 0 and the POCs of 256, are present in the DPB. However, the reference pictures having the same POC MSB are necessarily be not present in initially intended situation and MSB information is not signaled, causing a problem.

When an algorithm for deriving RefPicSetLtCurr and RefPicSetLtFoll is applied, a problem occurs that a reference picture marked as "used for long-term reference" is maintained and accordingly the reference picture with the POC of 256 cannot but be marked as "unused for reference."

In order to solve the foregoing problem, various exemplary embodiments may be applicable, which will be described below.

First Embodiment

According to a first embodiment of the present invention, information for calculating or inferring an MSB of a POC of an LTRP is signaled through a slice header.

In the present embodiment, the following method is used to signal an LTRP via a slice header. In this case, delta_poc_msb_present_flag [i] does not need signaling, and delta_poc_msb_cycle_lt [i] is always signaled.

1. A process of deriving POC lists (PocLtCurr and PocLtFoll) of an LTRP is as follows.

```
for( i = 0, j = 0, k = 0; i < num_long_term_sps + num_long_term_pics; i++) {
    pocLt = PocLsbLt[ i ] + (PicOrderCntVal − DeltaPocMSBCycleLt[ i ] *
MaxPicOrderCntLsb − pic_order_cnt_lsb)
        if(UsedByCurrPicLt[i ]){
            PocLtCurr[ j ] = pocLt
        } else {
            PocLtFoll[ k ] − pocLt
        }
}
NumPocLtCurr = j
NumPocLtFoll = k←
```

As described above, defining a number (NumPocLtCurr) of POCs included in PocLtCurr as j and a number (NumPocLtFoll) of POCs included in PocLtFoll as k, the foregoing process is repeated j+k times, thereby calculating a POC (pocLt) of the LTRP.

PocLsbLt[i] is a variable representing a POC LSB of an i-th LTRP, PicOrderCntVal is a variable representing a POC of a current picture, and DeltaPocMSBCycleLt[i] is a variable representing a difference in POC MSB between the current picture and the i-th LTRP.

MaxPicOrderCntLsb is a maximum value representing a POC LSB, and pic_order_cnt_lsb is a value representing a remainder obtained by dividing the POC of the current picture by MaxPicOrderCntLsb, which is transmitted from the encoding apparatus to the decoding apparatus.

2. An RPS for the LTRP is derived using PocLtCurr and PocLtFoll obtained by the process 1 as follows.

```
for( i = 0; i <NumPocLtCurr;i++ )
    if( there is a long-term reference picture picX in the DPB
            with PicOrderCntVal equal to PocLtCurr[ i ])
        RefPicSetLtCurr[i ] = picX
    else if( there is a short-term reference picture picY in the DPB
            with PicOrderCntVal equal to PocLtCurr[ i ])
        RefPicSetLtCurr[i ] = picY
    else
        RefPicSetLtCurr[i ] = "no reference picture"

for( i = 0; i < NumPocLtFoll; i++)
    if( there is a long-term reference picture picX in the DPB
            with PicOrderCntVal to PocLtFoll[i ] )
        RefPicSetLtFoll[i ] = picX
    else if( there is a short-term reference picture picY in the DPB
            with PicOrderCntVal equal to PocLtFoll[i ] )
        RefPicSetLtFoll[i ] = picY
    else
        RefPicSetLtFoll[i ] = "no reference picture"←
```

A syntax element relating to the LTRP signalled via the slice header in the present embodiment is illustrated in Table 1.

TABLE 1

|  | Descriptor |
|---|---|
| slice_segment_header( ) { | |
| ... | |
|   if( !dependent_slice_segment_flag ) { | |
| ... | |
|     if( !IdrPicFlag ) { | |
| ... | |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ) { | |
|           if( i < num_long_term_sps ) | |
|             lt_idx_sps[ i ] | u(v) |
|           else { | |
|             poc_lsb_lt[ i ] | u(v) |
|             used_by_curr_pic_lt_flag[ i ] | u(1) |
|           } | |
|           delta_poc_msb_cycle_lt[ i ] | ue(v) |
|         } | |
|       } | |
|     } | |
| ... | |
|   } | |
| ... | |
| } | |

Referring to Table 1, num_long_term_sps specifies a number of entries of an LTRPS of the current picture derived based on a candidate LTRP specified in an activated SPS. num_long_term_sps has a value ranging from 0 to a value specified by num_long_term_ref_pics_sps. If num_long_term_sps is not present, num_long_term_sps is inferred as 0.

num_long_term_pics specifies a number of entries of an LTRPS of the current picture directly signaled via the slice header. If num_long_term_pic is not present, num_long_term_pic is inferred as 0.

lt_idx_sps[i] specifies an index of an i-th entry of the LTRPS of the current picture in a list of the candidate LTRP specified by the activated SPS. A bit number representing lt_idx_sps[i] is Ceil(Log 2(num_long_term_ref_pics_sps)). It lt_idx_sps[i] is not present, lt_idx_sps[i] is inferred as 0. lt_idx_sps[i] has a value ranging from 0 to num_long_term_ref_pics_sps−1.

poc_lsb_lt[i] specifies the value of a POC modulo MaxPicOrderCntLsb of the i-th entry an LTRPS of the current picture. poc_lsb_lt[i] has a length of log 2_max_pic_order_cnt_lsb_minus4+4 bits.

used_by_curr_pic_lt_flag[i] equal to 0 specifies that the i-th entry of the LTRPS of the current picture is not referenced by the current picture.

delta_poc_msb_cycle_lt[i] is used to determine an MSB of a POC of the i-th entry of the LTRPS of the current picture. If delta_poc_msb_cycle_lt is not present, delta_poc_msb_cycle_lt is inferred as 0.

Figure 7:
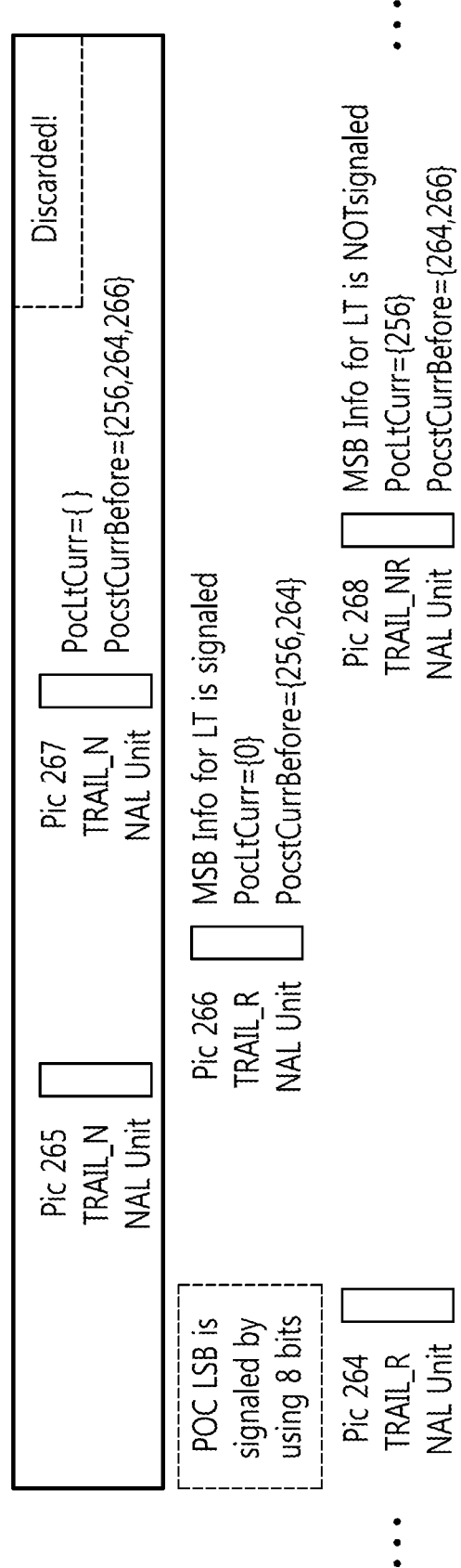
FIG. 7 illustrates a process of deriving an RPS and marking a picture for Pic 266 and Pic 268 according to a first embodiment of the present invention.

FIG. 7 illustrates a process of deriving an RPS and marking a picture for Pic 266 and Pic 268 illustrated in FIG. 6 according to the first embodiment. According to the embodiment of FIG. 7, the foregoing problem does not occur any more.

1. For Pic 266, an RPS is derived and a reference picture is marked as follows.
RefPicSetLtCurr={0}←
RefPicSetLtFoll={ }←
RefPicSetStCurrBefore={256, 264}←
RefPicSetStCurrAfter={ }←
RefPicSetStFoft={ }←
State of DPB:←
    Reference picture with POC 0 is marked as "used for long-term reference"←
    Reference picture with POC 256 is marked as "used for short-term reference"←
    Reference picture with POC 264 is marked as "used for short-term reference"←
    Reference picture with POC 252 is marked as "unused for reference"←

2. For Pic 268, an RPS is derived and a reference picture is marked as follows.
RefPicSetLtCurr={256}←
RefPicSetLtFoll={ }←
RefPicSetStCurrBefore={264, 266}←
RefPicSetStCurrAfter={ }←
RefPicSetStFoll={ }←
State of DPB:←
    Reference picture with POC 256 is marked as "used for long-term reference"←
    Reference picture with POC 264 is marked as "used for short-term reference"←
    Reference picture with POC 266 is marked as "used for short-term reference"←
    Reference picture with POC 0 is marked as "unused for reference"←

As illustrated in Table 1, as MSB information on an LTRP for each picture is signaled, a picture with a POC of 256 is marked as "used for long-term reference" and a picture with a POC of 0 is marked as "unused for reference" when the LTRPS for Pic 268 is derived.

Second Embodiment

According to a second embodiment of the present invention, when information for calculating or inferring an MSB of a POC of an LTRP with respect to a specific POC LSB is signaled once, the information for calculating or inferring the MSB of the POC is always used along with the specific POC LSB when the specific POC LSB is used for signaling the LTRP.

The second embodiment may be modified as follows.
Variation 1

When information for calculating or inferring an MSB of a POC of an LTRP with respect to a specific POC LSB is signaled once, the information for calculating or inferring the MSB of the POC is always used along with the specific POC LSB when the specific POC LSB is used for signaling the LTRP with respect to a picture remaining in a sequence.
Variation 2

When information for calculating or inferring an MSB of a POC of an LTRP with respect to a specific POC LSB is signaled once, the information for calculating or inferring the MSB of the POC is always used along with the specific POC LSB when the specific POC LSB is used for signaling the LTRP with respect to a picture remaining in a bit stream.
Variation 3

When information for calculating or inferring an MSB of a POC of an LTRP with respect to a specific POC LSB is signaled once, the information for calculating or inferring the MSB of the POC is always used along with the specific POC LSB when the specific POC LSB is used for signaling the LTRP to a next random access point.

Derived RPSs and marked pictures for Pic 266 and Pic 268 of FIG. 6 according to the present embodiment are illustrated in FIG. 7.

In FIG. 7, since MSB information is signaled for a picture with an LSB of a previous POC of 0, MSB information for an LTRP is necessarily signaled with respect to the picture with the POC of 268. The MSB information is signaled even when there are no reference pictures having the same POC LSB in the DPB by discarding a picture, and accordingly the foregoing problem does not occur any more.

1. For Pic 266, an RPS is derived and a reference picture is marked as follows.
RefPicSetLtCurr={0}←
RefPicSetLtFoft={ }←
RefPicSetStCurrBefore={256, 264}←
RefPicSetStCurrAfter={ }←
RefPicSetStFoll={ }←
State of DPB:←
    Reference picture with POC 0 is marked as "used for long-term reference"←
    Reference picture with POC 256 is marked as "used for short-term reference"←
    Reference picture with POC 264 is marked as "used for short-term reference"←
    Reference picture with POC 252 is marked as "unused for reference"←

2. For Pic 268, an RPS is derived and a reference picture is marked as follows.
RefPicSetLtCurr={256}←
RefPicSetLtFoll={ }←
RefPicSetStCurrBefore={264, 266}←

RefPicSetStCurrAfter={ }←
RefPicSetStFoll={ }←
State of DPB:←
    Reference picture with POC 256 is marked as "used for long-term reference"←
    Reference picture with POC 264 is marked as "used for short-term reference"←
    Reference picture with POC 266 is marked as "used for short-term reference"←
    Reference picture with POC 0 is marked as "unused for reference"←

The Third Embodiment

According to a third embodiment of the present invention, if a current picture can be discarded without affecting decodability of other pictures, an LTRP in the DPB is not allowed to be marked as "unused for reference."

A process of deriving an RPS according to the present embodiment is as follows.

1. An LTRPS is derived first, and an LTRP is marked.

```
for( i = 0; i < NumPocLtCurr;i++ )↓
    if( !CurrDeltaPocMsbPresentFlag[ i ] )↓
        if( there is a long-term reference picture picX in the DPB ↓
                with pic_order_cnt_lsb equal to PocLtCurr[i ] ) ↓
            RefPicSetLtCurr[i ] =picX↓
        else if( there is a short-term reference picture picY in the DPB
                with pic_order_cnt_lsb equal to PocLtCurr[i ] )↓
            RefPicSetLtCurr[i ] = picY↓
        else  ↓
            RefPicSetLtCurr[i ] = "no reference picture" ↓
    else↓
        if( there is a long-term reference picture picX in the DPB↓
                with PicOrderCntVal equal to PocLtCurr[i ])↓
            RefPicSetLtCurr[i ] = picX↓
        else if( there is a short-term reference picture picY in the DPB
                with PicOrderCntVal equal to PocLtCurr[i ] ) ↓
            RefPicSetLtCurr[i ] = picY↓
        else
            RefPicSetLtCurr[i ] = "no reference picture"←
for( i = 0; i < NumPocLtFoll;i++)↓
    if( !FollDeltaPocMsbPresentFlag[ i ] ) ↓
        if( there is a long-term reference picture picX in the DPB↓
                with pic_order_cnt_lsb equal to PocLtFoll[ i ] )↓
            RefPicSetLtFoll[i ] = picX↓
        else if( there is a short-term reference picture picY in the DPB↓
                with pic_order_cnt_lsb equal to PocLtFoll[ i ] )↓
            RefPicSetLtFoll[i ] = picY↓
        else  ↓
            RefPicSetLtFoll[i ] = "no reference picture"↓
    else↓
        if( there is a long-term reference picture picX in the DPB↓
                with PicOrderCntVal to PocLtFoll[i ] ) ↓
            RefPicSetLtFoll[i ]=picX↓
        else if( there is a short-term reference picture picY in the DPB
                with PicOrderCntVal equal to PocLtFoll[i ] )↓
            RefPicSetLtFoll[i ] = picY↓
        else↓
            RefPicSetLtFoll[ i ] = "no reference picture"←
```

2. All reference pictures included in RefPicSetLtCurr and RefPicSetLtFoll are marked as "used for long-term reference," that is, "used as LTRPs."

3. As illustrated below, an STRPS is derived, and an STRP is marked.

```
for( i = 0; i < NumPocStCurrBefore; i++ )↓
    if( there is a short-term reference picture picX in the DPB↓
            with PicOrderCntVal equal to PocStCurrBefore[i ])↓
        RefPicSetStCurrBefore[i ] =picX↓
    else↓
        RefPicSetStCurrBefore[i ] = "no reference picture"↓
for( i = 0; i < NumPocStCurrAfter; i++ )↓
    if( there is a short-term reference picture picX in the DPB↓
            with PicOrderCntVal equal to PocStCurrAfter[i ])↓
        RefPicSetStCurrAfter[i ] =picX↓
    else↓
        RefPicSetStCurrAfter[i ] = "no reference picture"
for( i = 0; i < NumPocStFoll; i++ ) ↓
    if( there is a short-term reference picture picX in the DPB↓
            with PicOrderCntVal equal to PocStFoll[i ]) ↓
        RefPicSetStFoll[i ] =picX↓
    else↓
        RefPicSetStFoll[i ] = "no reference picture"←
```

4. If an NAL unit type of the current picture is not a non-reference picture, that is, TRAIL_N, TSA_N, STSA_N, RADL_N or RASL_N, all reference pictures in the DPB marked as "used for long-term reference," not included in RefPicSetLtCurr and RefPicSetLtFoll, are marked as "unused for reference."

A random access decodable leading (RADL) picture as a RADL NAL unit type refers to a picture which precedes a random access point picture in output order but follows the random access point picture in decoding order, which is not used as reference picture for decoding process of trailing pictures associated the random access point picture.

A random access skipped leading (RASL) picture as an RASL NAL unit type refers to a picture which precedes a random access point picture in output order but follows the random access point picture in decoding order, which relates to a BLA picture and a CRA picture. The RASL picture may refer to pictures that are not present in a bit stream and thus may not be output and decoded correctly.

5. Alternatively, if the NAL unit type of the current picture is any one of TRAIL_N, TSA_N, STSA_N, RADL_N and RASL_N as non-reference pictures, all reference pictures in the DPB marked as "used for long-term reference," not included in RefPicSetLtCurr and RefPicSetLtFoll, are automatically included in RefPicSetLtFoll.

6. All reference pictures in the DPB marked as "used for long-term reference" are marked as "unused for reference," not included in RefPicSetLtCurr, RefPicSetLtFoll, RefPicSetStCurrBefore, RefPicSetStCurrAfter and RefPicSetStFoll, are marked as "unused for reference."

Figure 8:
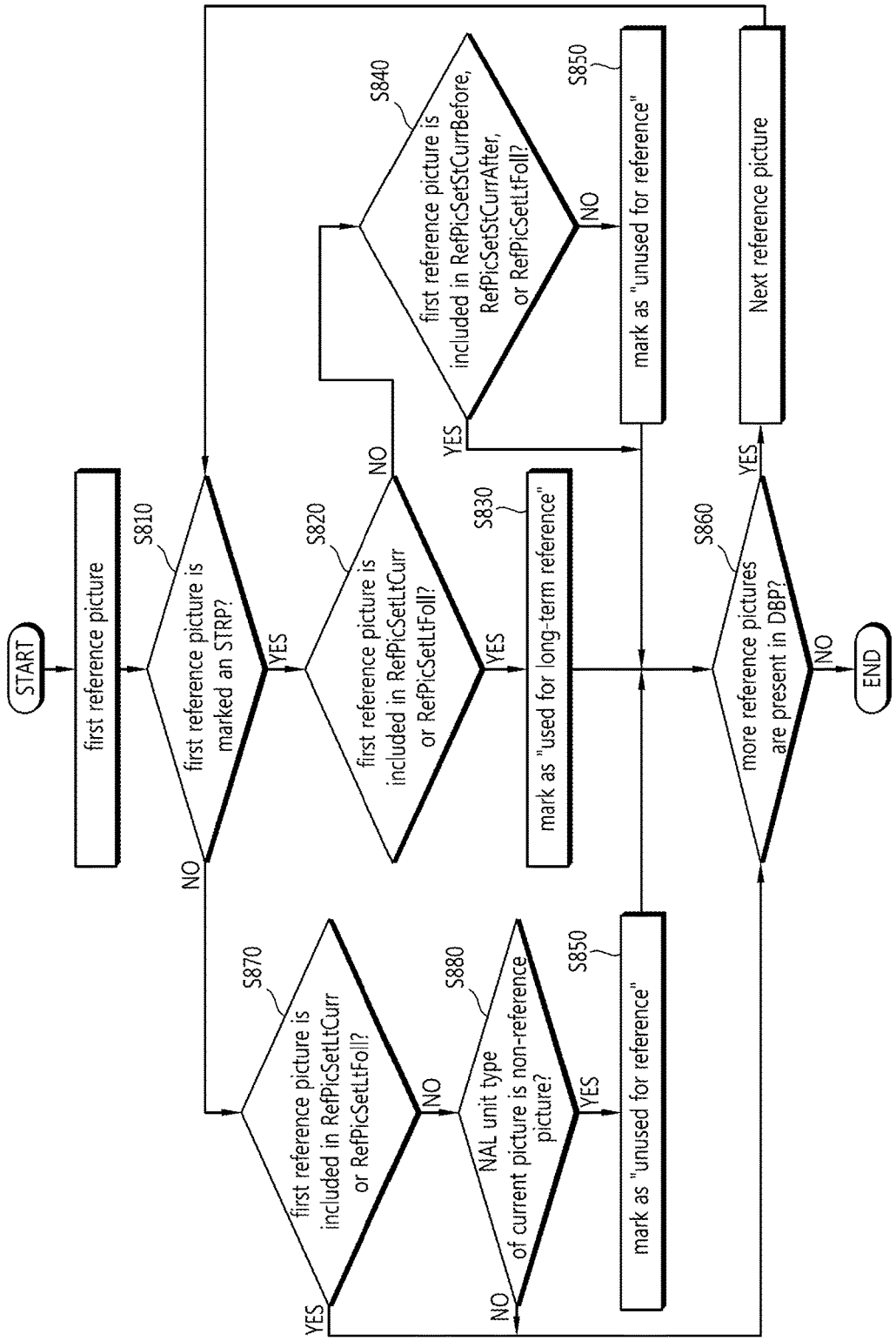
FIG. 8 illustrates a marking process according to a third embodiment of the present invention.

FIG. 8 illustrates a marking process according to the third embodiment. Each reference picture in the DBP may be marked according to the process of FIG. 8.

First, it is determined whether a first reference picture is marked as an STRP, that is, whether the first reference picture is an STRP (S810).

If the first reference picture is an STRP, operation S820 is carried out. If the first reference picture is not an STRP, operation S870 is carried out.

If the first reference picture is an STRP, it is determined whether the first reference picture is included in RefPicSetLtCurr or RefPicSetLtFoll (S820).

If the first reference picture is included in RefPicSetLtCurr or RefPicSetLtFoll, the first reference picture is marked as "used for long-term reference" (S830), followed by operation S860.

If the first reference picture is not included in RefPicSetLtCurr and RefPicSetLtFoll, operation S840 is carried out.

If the first reference picture is not included in RefPicSetLtCurr and RefPicSetLtFoll, it is determined whether the first reference picture is included in RefPicSetStCurrBefore, RefPicSetStCurrAfter, or RefPicSetLtFoll (S840).

If the first reference picture is not included in RefPicSetStCurrBefore, RefPicSetStCurrAfter, and RefPicSetLtFoll, the first reference picture is marked as "unused for reference" (S850), followed by operation S860.

If the first reference picture is included in RefPicSetStCurrBefore, RefPicSetStCurrAfter, or RefPicSetLtFoll, operation S860 is carried out.

If the first reference picture is not an STRP in operation S810, it is determined whether the first reference picture is included in RefPicSetLtCurr or RefPicSetLtFoll (S870).

If the first reference picture is included in RefPicSetLtCurr or RefPicSetLtFoll, operation S860 is carried out. If the first reference picture is not included in RefPicSetLtCurr and RefPicSetLtFoll, operation S880 is carried out.

If the first reference picture is not included in RefPicSetLtCurr and RefPicSetLtFoll, it is determined whether an NAL unit type of a current picture is a non-reference picture (S880).

If the NAL unit type of the current picture is a non-reference picture, the first reference picture is marked as "unused for reference" (S850), followed by operation S860.

If the NAL unit type of the current picture is not a non-reference picture, operation S860 is carried out.

It is determined whether more reference pictures are present in the DPB in operation S860. If an additional reference picture is present, a next reference picture as a reference picture marking target is subjected to the foregoing process to start operation S810.

If there is no reference picture as a reference picture marking target, the reference picture marking process terminates.

Derived RPSs and marked pictures for Pic 266 and Pic 268 of FIG. 6 according to the present embodiment are illustrated in FIG. 7.

When processing Pic 267 having an NAL unit type of TRAIL_N, an LTRP may not be marked as "unused for reference," and thus two reference pictures having the same POC LSB are present when processing Pic 268. Thus, according to FIG. 7, in a process of marking Pic 268, MSB information for an LTRP is signaled, and accordingly the foregoing problem does not occur any more.

1. For Pic 266, an RPS is derived and a reference picture is marked as follows.

RefPicetLtCurr={0}←
RefPicSetLtFoll={ }←
RefPicSetStCurrBefore={256, 264}←
RefPicSetStCurrAfter={ }←
RefPicSetStFoll={ }←
State of DPB:←
    Reference picture with POC 0 is marked as "used for long-term reference"←
    Reference picture with POC 256 is marked as "used for short-term reference"←
    Reference picture with POC 264 is marked as "used for short-term. reference"←
    Reference picture with POC 252 is marked as "unused for reference"←

2. For Pic 268, an RPS is derived and a reference picture is marked as follows.

RefPicSetLtCurr={256}←
RefPicSetLrFoll={ }←
RefPicSetStCurrBefore={264, 266}←
RefPicSetStCurrAfter={ }
RelPicSetStFoll=}
State of DPB:←
    Reference picture with POC 256 is marked as "used for long-term reference"←
    Reference picture with POC 264 is marked as "used for short-term reference"←
    Reference picture with POC 266 is marked as "used for short-term reference"←
    Reference picture with POC 0 is marked as "unused for reference"←

Fourth Embodiment

According to a fourth embodiment of the present invention, if a current picture is not a base temporal layer, that is, TemporalId identifying a temporal sub-layer is not 0, an LTRP in the DPB is not allowed to be marked as "unused for reference."

The fourth embodiment may be varied as follows.

When the current picture is a base temporal layer, that is, TemporalId is 0, an LTRP in the DPB is marked as "unused for reference."

According to the foregoing variation of the fourth embodiment, an RPS for an LTRP is derived as follows.

1. An LTRPS is derived first, and an LTRP is marked.

```
for( i = 0; i < NumPocLtCurr; i++ )
    if(!CurrDeltaPocMsbPresentFlag[ i ]
        if( there is a long-term reference picture picX in the DPB
            with pic_order_cnt_lsb equal to PocLtCurr[ i ] )
            RefPicSetLtCurr[ i ] = picX
        else if( there is a short-term reference picture picY in the DPB
            with pic_order_cnt_lsb equal to PocLtCurr[ i ])
            RefPicSetLtCurr[i ]=picY
        else
            RefPicSetLtCurr[ i ] = "no reference picture"
    else
        if( there is a long-term reference picture picX in the DPB
            with PicOrderCntVal equal to PocLtCurr[ i ])
            RefPicSetLtCurr[ i ] = picX
        else if( there is a short-term reference picture picY in the DPB
            with PicOrderCntVal equal to PocLtCurr[ i ] )
            RefPicSetLtCurr[ i ] =picY
        else
            RefPicSetLtCurr[i ] = "no reference picture" ←
for( i = 0; i < NumPocLtFoll; i++)
    if( !FollDeltaPocMsbPresentFlag[ i ] )
        if( there is a long-term reference picture picX in the DPB
            with pic_order_cnt_lsb equal to PocLtFoll[ i ] )
            RefPicSetLtFoll[ i ]=picX
```

```
            else if( there is a short-term reference picture picY in the DPB
                        with pic_order_cnt_lsb equal to PocLtFoll[ i ] )
                    RefPicSetLtFoll[ i ] = picY
                else
                    RefPicSetLtFoll[ i ] = "no reference picture"
    else
            if( there is a long-term reference picture picX in the DPB
                    with PicOrderCntVal to PocLtFoll[ i ])
                RefPicSetLtFoll[ i ] = picX
            else if( there is a short-term reference picture picY in the DPB
                    with PicOrderCntVal equal to PocLtFoll[ i ] )
                    RefPicSetLtFoll[ i ] = picY
            else
RefPicSetLtFoll[ i ] = "no reference picture"
```

2. All reference pictures included in RefPicSetLtCurr and RefPicSetLtFoll are marked as "used for long-term reference," that is, "used as LTRPs."

3. As illustrated below, an STRPS is derived, and an STRP is marked.

```
for( i =0; i < NumPocStCurrBefore; i++)
        if( there is a short-term reference picture picX in the DPB
                with PicOrderCntVal equal to PocStCurrBefore[ i ])
            RefPicSetStCurrBefore[ i ] = picX
        else
            RefPicSetStCurrBefore[ i ] = "no reference picture"
for( i = 0; i < NumPocStCurrAfter; i++)
        if( there is a short-term reference picture picX in the DPB
                with PicOrderCntVal equal to PocStCurrAfter[ i ])
            RefPicSetStCurrAfter[ i ] = picX
        else
            RefPicSetStCurrAfter[ i ] = "no reference picture"
for( i = 0; i < NumPocStFoll; i++ )
        if( there is a short-term reference picture picX in the DPB
                with PicOrderCntVal equal to PocStFoll[ i ])
            RefPicSetStFoll[ i ] = picX
        else
RefPicSetStFoll[ i ] = "no reference picture"
```

4. If TemporalId of the current picture is 0, all pictures included in the DPB marked as "used for long-term reference," not included in RefPicSetLtCurr and RefPicSetLtFoll, are marked as "unused for reference."

5. Alternatively, if TemporalId of the current picture is not 0, all pictures included in the DPB marked as "used for long-term reference," not included in RefPicSetLtCurr and RefPicSetLtFoll, are automatically included in RefPicSetLtFoll.

6. All reference pictures in the DPB marked as "used for short-term reference," not included in RefPicSetLtCurr, RefPicSetLtFoll, RefPicSetStCurrBefore, RefPicSetStCurrAfter and RefPicSetStFoll, are marked as "unused for reference."

Figure 9:
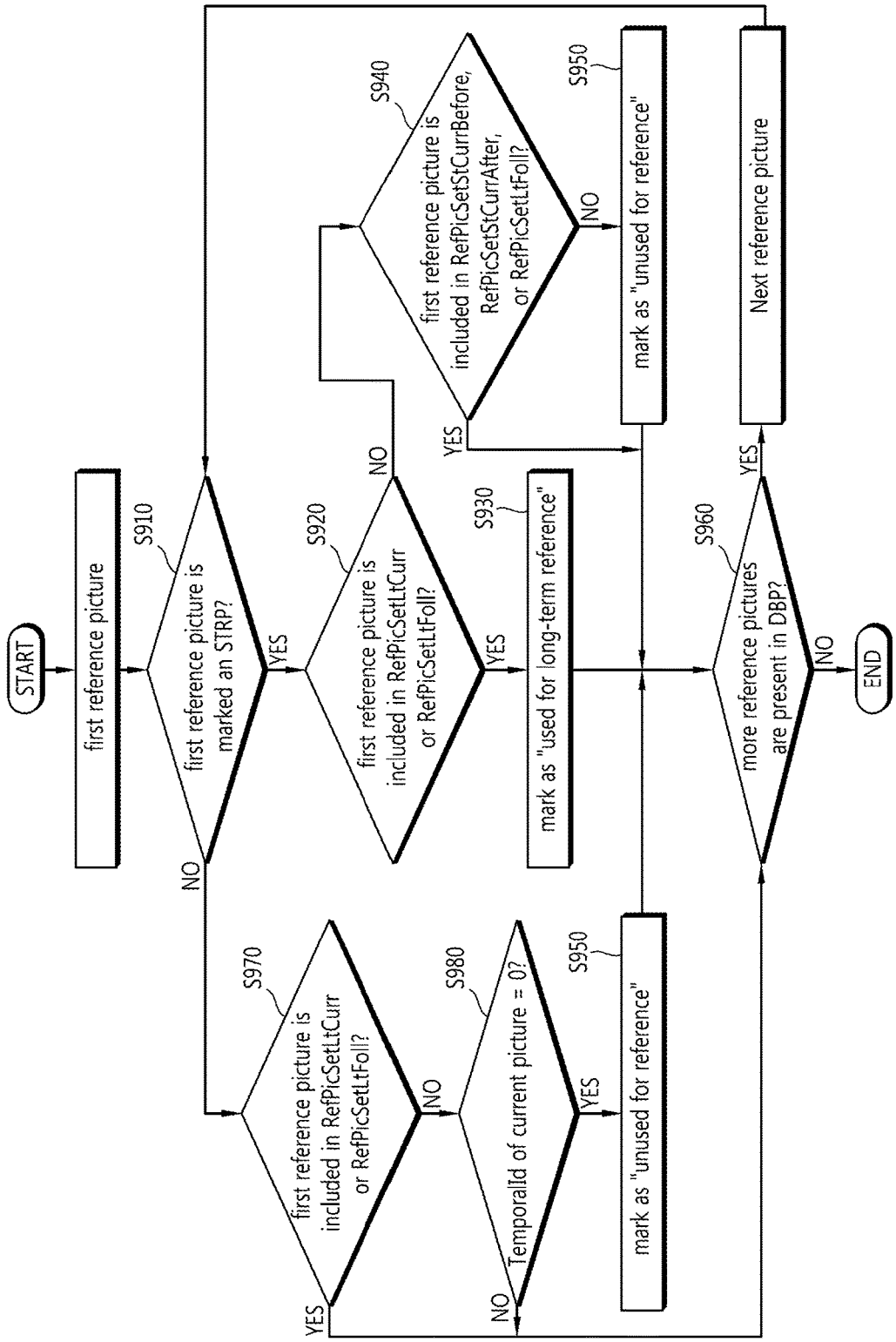
FIG. 9 illustrates a marking process according to a fourth embodiment of the present invention.

FIG. 9 illustrates a marking process according to the fourth embodiment. Each reference picture in the DBP may be marked according to the process of FIG. 9.

First, it is determined whether a first reference picture is marked as an STRP, that is, whether the first reference picture is an STRP (S910).

If the first reference picture is an STRP, operation S920 is carried out. If the first reference picture is not an STRP, operation S970 is carried out.

If the first reference picture is an STRP, it is determined whether the first reference picture is included in RefPicSetLtCurr or RefPicSetLtFoll (S920).

If the first reference picture is included in RefPicSetLtCurr or RefPicSetLtFoll, the first reference picture is marked as "used for long-term reference" (S930), followed by operation S960.

If the first reference picture is not included in RefPicSetLtCurr and RefPicSetLtFoll, operation S940 is carried out.

If the first reference picture is not included in RefPicSetLtCurr and RefPicSetLtFoll, it is determined whether the first reference picture is included in RefPicSetStCurrBefore, RefPicSetStCurrAfter, or RefPicSetLtFoll (S940).

If the first reference picture is not included in RefPicSetStCurrBefore, RefPicSetStCurrAfter, and RefPicSetLtFoll, the first reference picture is marked as "unused for reference" (S950), followed by operation S960.

If the first reference picture is included in RefPicSetStCurrBefore, RefPicSetStCurrAfter, or RefPicSetLtFoll, operation S960 is carried out.

If the first reference picture is not an STRP in operation S910, it is determined whether the first reference picture is included in RefPicSetLtCurr or RefPicSetLtFoll (S970).

If the first reference picture is included in RefPicSetLtCurr or RefPicSetLtFoll, operation S960 is carried out. If the first reference picture is not included in RefPicSetLtCurr and RefPicSetLtFoll, operation S980 is carried out.

If the first reference picture is not included in RefPicSetLtCurr and RefPicSetLtFoll, it is determined whether TemporalId of the current picture is 0 (S980).

If TemporalId of the current picture is 0, the first reference picture is marked as "unused for reference" (S950), followed by operation S960.

If TemporalId of the current picture is not 0, operation S960 is carried out.

It is determined whether more reference pictures are present in the DPB in operation S960. If an additional reference picture is present, a next reference picture as a reference picture marking target is subjected to the foregoing process to start operation S910.

If there is no reference picture as a reference picture marking target, the reference picture marking process terminates.

Derived RPSs and marked pictures for Pic 266 and Pic 268 of FIG. 6 according to the present embodiment are illustrated in FIG. 7.

When processing Pic 267 having TemporalId which is not 0, an LTRP may not be marked as "unused for reference," and thus two reference pictures having the same POC LSB are present when processing Pic 268. Thus, according to FIG. 7, in a process of marking Pic 268, MSB information for an LTRP is signaled, and accordingly the foregoing problem does not occur any more.

1. For Pic 266, an RPS is derived and a reference picture is marked as follows.
RefPicSetLtCurr={0}
RefPicSetLtFoll={ }
RefPicSetStCurrBefore={256, 264}
RefPicSetStCurrAfter={ }
RefPicSetStFoll={ }
State of DPB:
  Reference picture with POC 0 is marked as "used for long-term reference"
  Reference picture with POC 256 is marked as "used for short-term reference"
  Reference picture with POC 264 is marked as "used for short-term reference"
  Reference picture with POC 252 is marked as "unused for reference"

2. For Pic 268, an RPS is derived and a reference picture is marked as follows.
RefPicSetLtCurr={256}
RefPicSetLtFoll={ }
RefPicSetStCurrBefore={264, 266}
RefPicSetStCurrAfter={ }
RefPicSetStFoll={ }
State of DPB:
  Reference picture with POC 256 is marked as "used for long-term reference"
  Reference picture with POC 264 is marked as "used for short-term reference"
  Reference picture with POC 266 is marked as "used for short-term reference"
  Reference picture with POC 0 is marked as "unused for reference"

Fifth Embodiment

According to a fifth embodiment of the present invention, if a current picture is not at a base temporal layer, that is, TemporalId is not 0, and is a picture that can be discarded without affecting decodability of other pictures having the same TemporalId, an LTRP in the DPB is not allowed to be marked as "unused for reference."

The fifth embodiment may be modified as follows.

When the current picture is at the base temporal layer, that is, TemporalId is 0, and it cannot be discarded without affecting decodability of other pictures having the same TemporalId, an LTRP in the DPB is marked as "unused for reference."

According to the foregoing variation of the fifth embodiment, an RPS for an LTRP is derived as follows.

1. An LTRPS is derived first, and an LTRP is marked.

```
for( i = 0; i < NumPocLtCurr; i++)
    if( !CurrDeltaPocMsbPresentFlag[ i ] )
        if( there is a long-term reference picture picX in the DPB
                with pic_order_cnt_lsb equal to PocLtCurr[ i ] )
            RefPicSetLtCurr[ i ] = picX
        else if( there is a short-term reference picture picY in the DPB
                with pic_order_cnt_lsb equal to PocLtCurr[ i ] )
            RefPicSetLtCurr[ i ] = picY
        else
            RefPicSetLtCurr[ i ] = "no reference picture"
    else
        if( there is a long-term reference picture picX in the DPB
                with PicOrderCntVal equal to PocLtCurr[ i ] )
            RefPicSetLtCurr[ i ] = picX
        else if( there is a short-term reference picture picY in the DPB
                with PicOrderCntVal equal to PocLtCurr[ i ] )
            RefPicSetLtCurr[ i ] = picY
        else
            RefPicSetLtCurr[ i ] = "no reference picture"
for( i = 0; i < NumPocLtFoll; i++ )
    if( !FollDeltaPocMsbPresentFlag[ i ] )
        if( there is a long-term reference picture picX in the DPB
                with pic_order_cnt_lsb equal to PocLtFoll[ i ] )
            RefPicSetLtFoll[ i ] = picX
        else if( there is a short-term reference picture picY in the DPB
                with pic_order_cnt_lsb equal to PocLtFoll[ i ] )
            RefPicSetLtFoll[ i ] = picY
        else
            RefPicSetLtFoll[ i ] = "no reference picture"
    else
        if( there is a long-term reference picture picX in the DPB
                with PicOrderCntVal to PocLtFoll[ i ] )
            RefPicSetLtFoll[ i ]=picX
        else if( there is a short-term reference picture picY in the DPB
                with PicOrderCntVal equal to PocLtFoll[ i ] )
            RefPicSetLtFoll[ i ] = picY
        else
            RefPicSetLtFoll[ i ] = "no reference picture"
```

2. All reference pictures included in RefPicSetLtCurr and RefPicSetLtFoll are marked as "used for long-term reference," that is, "used as LTRPs."

3. As illustrated below, an STRPS is derived and an STRP is marked.

```
for( i = 0; i < NumPocStCurrBefore; i++ )
    if( there is a short-term reference picture picX in the DPB
            with PicOrderCntVal equal to PocStCurrBefore[ i ])
        RefPicSetStCurrBefore[ i ] = picX
    else
        RefPicSetStCurrBefore[ i ] = "no reference picture"
for( i = 0; i < NumPocStCurrAfter; i++ )
    if( there is a short-term reference picture picX in the DPB
            with PicOrderCntVal equal to PocStCurrAfter[ i ])
        RefPicSetStCurrAfter[ i ] = picX
    else
        RefPicSetStCurrAfter[ i ] = "no reference picture"
for( i = 0; i < NumPocStFoll; i++ )
    if( there is a short-term reference picture picX in the DPB
            with PicOrderCntVal equal to PocStFoll[ i ])
        RefPicSetStFoll[ i ] = picX
    else
        RefPicSetStFoll[ i ] = "no reference picture"
```

4. If TemporalId of the current picture is 0 and an NAL unit type thereof is none of TRAIL_N, TSA_N, STSA_N, RADL_N and RASL_N, all pictures included in the DPB marked as "used for long-term reference," not included in RefPicSetLtCurr and RefPicSetLtFoll, are marked as "unused for reference."

5. Alternatively, if TemporalId of the current picture is not 0 or the NAL unit type is one of TRAIL_N, TSA_N, STSA_N, RADL_N and RASL_N, all pictures included in the DPB marked as "used for long-term reference," not included in RefPicSetLtCurr and RefPicSetLtFoll, are automatically included in RefPicSetLtFoll.

6. All reference pictures in the DPB marked as "used for short-term reference," not included in RefPicSetLtCurr, RefPicSetLtFoll, RefPicSetStCurrBefore, RefPicSetStCurrAfter and RefPicSetStFoll, are marked as "unused for reference."

Figure 10:
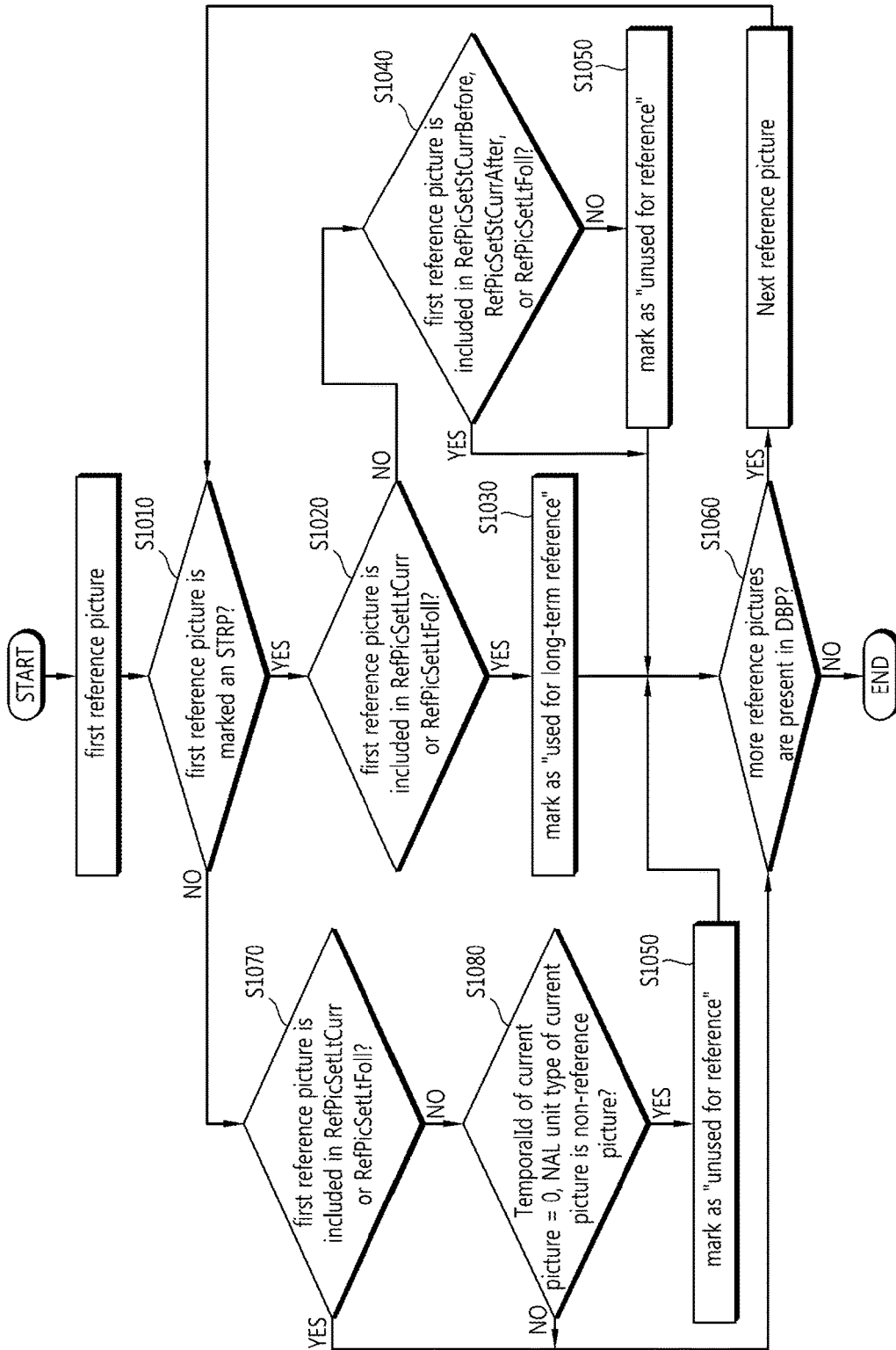
FIG. 10 illustrates a marking process according to a fifth embodiment of the present invention.

FIG. 10 illustrates a marking process according to the fifth embodiment. Each reference picture in the DBP may be marked according to the process of FIG. 10.

First, it is determined whether a first reference picture is marked as an STRP, that is, whether the first reference picture is an STRP (S1010).

If the first reference picture is an STRP, operation S1020 is carried out. If the first reference picture is not an STRP, operation S1070 is carried out.

If the first reference picture is an STRP, it is determined whether the first reference picture is included in RefPicSetLtCurr or RefPicSetLtFoll (S1020).

If the first reference picture is included in RefPicSetLtCurr or RefPicSetLtFoll, the first reference picture is marked as "used for long-term reference" (S1030), followed by operation S1060.

If the first reference picture is not included in RefPicSetLtCurr and RefPicSetLtFoll, operation S1040 is carried out.

If the first reference picture is not included in RefPicSetLtCurr and RefPicSetLtFoll, it is determined whether the first reference picture is included in RefPicSetStCurrBefore, RefPicSetStCurrAfter, or RefPicSetLtFoll (S1040).

If the first reference picture is not included in RefPicSetStCurrBefore, RefPicSetStCurrAfter, and RefPicSetLtFoll, the first reference picture is marked as "unused for reference" (S1050), followed by operation S1060.

If the first reference picture is included in RefPicSetStCurrBefore, RefPicSetStCurrAfter, or RefPicSetLtFoll, operation S1060 is carried out.

If the first reference picture is not an STRP in operation S1010, it is determined whether the first reference picture is included in RefPicSetLtCurr or RefPicSetLtFoll (S1070).

If the first reference picture is included in RefPicSetLtCurr or RefPicSetLtFoll, operation S1060 is carried out. If the first reference picture is not included in RefPicSetLtCurr and RefPicSetLtFoll, operation S1080 is carried out.

If the first reference picture is not included in RefPicSetLtCurr and RefPicSetLtFoll, it is determined whether TemporalId of the current picture is 0 and the NAL unit type is not a non-reference picture (S1080).

If TemporalId of the current picture is 0 and the NAL unit type is not a non-reference picture, the first reference picture is marked as "unused for reference" (S1050), followed by operation S1060.

If TemporalId of the current picture is not 0 or the NAL unit type is a non-reference picture, operation S1060 is carried out.

It is determined whether more reference pictures are present in the DPB in operation S1060. If an additional reference picture is present, a next reference picture as a reference picture marking target is subjected to the foregoing process to start operation S1010.

If there is no reference picture as a reference picture marking target, the reference picture marking process terminates.

Derived RPSs and marked pictures for Pic 266 and Pic 268 of FIG. 6 according to the present embodiment are illustrated in FIG. 7.

When processing Pic 267 having TemporalId which is not 0 and an NAL unit type which is one of TRAIL_N, TSA_N, STSA_N, RADL_N and RASL_N, an LTRP may not be marked as "unused for reference," and thus two reference pictures having the same POC LSB are present when processing Pic 268. Thus, according to FIG. 7, in a process of marking Pic 268, MSB information for an LTRP is signaled, and accordingly the foregoing problem does not occur any more.

1. For Pic 266, an RPS is derived and a reference picture is marked as follows.
RefPicSetLtCurr={0}←
RefPicSetLtFoll={ }←
RefPicSetStCurrBefore={256, 264}←
RefPicSetStCurrAfter={ }←
RefPicSetStFoft={ }
State of DPB:←
  Reference picture with POC 0 is marked as "used for long-term reference"←
  Reference picture with POC 256 is marked as "used for short-term reference"←
  Reference picture with POC 264 is marked as "used for short-term reference"←
  Reference picture with POC 252 is marked as "unused for reference"←

2. For Pic 268, an RPS is derived and a reference picture is marked as follows.
RefPicSetLtCurr={256}←
RefPicSetLtFoll={ }←
RefPicSetStCurrBefore={264, 266}←
RefPicSetStCurrAfter={ }←
RefPicSetStFoll={ }←
State of DPB:←
  Reference picture with POC 256 is marked as "used for long-term reference"←
  Reference picture with POC 264 is marked as "used for short-term reference"←
  Reference picture with POC 266 is marked as "used for short-term reference"←
  Reference picture with POC 0 is marked as "unused for reference"←

Sixth Embodiment

According to a sixth embodiment of the present invention, when two reference pictures having the same POC LSB are present, at least one of which is an LTRP that may be or is marked as "unused for reference," if a new LTRP having the same POC LSB as that of the LTRP marked as "unused for reference" is present before a picture which has TemporalId not 0 and is a picture that can be discarded without affecting decodability of other pictures with the same TemporalId, information for calculating or inferring a POC MSB of the new LTRP may be necessarily signaled until a picture having TemporalId equal to 0 and discardable without affecting decodability of other pictures having the same TemporalId is received or being included in the picture.

According to the present embodiment, the marking process is not changed except that the foregoing mandate or restriction is added, and the encoding apparatus may need to comply with the mandate or restriction.

The restriction may be applied to a semantic element delta_msb_poc_present_flag [i] controlling existence of the information for calculating or inferring the POC MSB of the LTRP.

Accordingly, the semantic element delta_poc_msb_present_flag[i] may be interpreted as follows.

delta_poc_msb_present_flag[i] is 1 when at least one LTRP marked as "unused for reference" and having the same POC LSB as poc_lsb_lt[i] is present after a last picture in decoding order having TemporalId equal to 0 and an NAL unit type that is none of TRAIL_N, TSA_N, STSA_N, RADL_N and RASL_N.

According to the present embodiment, information for calculating or inferring an MSB of a POC of 256 is signaled when marking a picture with a POC of 268.

Seventh Embodiment

According to a seventh embodiment of the present invention, when two reference pictures having the same POC LSB are present, at least one of which is an LTRP that may be or is marked as "unused for reference," if a new LTRP having the same POC LSB as that of the LTRP marked as "unused for reference" is present before a picture as a random access point, such as clean random access (CRA), instantaneous decoding refresh (IDR) and broken link access (BLA) pictures, information for calculating or inferring a POC MSB of the new LTRP may be necessarily signaled until the picture as the random access point is received or being included in the picture.

An IDR picture as an IDR NAL unit type is a randomly accessible picture, which may be a first picture or intermediate picture in a bit stream in decoding order. The NAL unit type of the IDR picture may be represented as IDR_W_RADL. If the IDR picture is not associated with a leading picture, the NAL unit type of the IDR picture may be represented as IDR_N_LP.

A CRA picture as a CRA NAL unit type is a randomly accessible picture, which may be a first picture or intermediate picture in a bit stream in decoding order. The CRA picture includes an I slice only. The CRA picture may be associated with a leading picture which may be decodable and a leading picture which may skip a decoding process. The leading picture which may skip the decoding process may use a reference picture not present in the bit stream, and thus the leading picture may not be output by a decoder.

A BLA picture as a BLA NAL unit type is a randomly accessible picture, which may be a first picture or intermediate picture in a bit stream in decoding order. The BLA picture also includes an I slice only. Each BLA picture may start a new coded video sequence (CVS) and be subjected to the same decoding process as the IDR picture.

According to the present embodiment, the marking process is not changed except that the foregoing mandate or restriction is added, and the encoding apparatus may need to comply with the mandate or restriction.

According to the present embodiment, information for calculating or inferring an MSB of a POC of 256 is signaled when marking a picture with a POC of 268.

Eighth Embodiment

According to an eighth embodiment of the present invention, when the following conditions or situations are satisfied, all LTRPs need to be signaled or included in an RPS of a current slice or current picture.

The present embodiment is applied under the conditions that a temporal level of the current picture is not 0, that is, TemporalId is not 0, or the current picture can be discarded without affecting decodability of other pictures having the same TemporalId and one or more pictures having the same POC LSB are present in the DPB, one of which is an LTRP.

Here, an LTRP unused by the current slice may be still be included in the RPS, with a syntax element used_by_curr_pic_lt_flag[i] having a value of 0.

According to the present embodiment, the marking process is not changed except that the foregoing mandate or restriction is added, and the encoding apparatus may need to comply with the mandate or restriction.

The following constrain may be applied to the RPS.

That is, the RPS is required to have bit stream conformance that if TemporalId of the current picture/slice is not 0 or an NAL unit type of the current slice is one of TRAIL_N, TSA_N, STSA_N, RADL_N and RASL_N, and one or more reference pictures having the same POC LSB are present in the DPB, at least one of which is an LTRP, all LTRPs are necessarily included in the RPS of the current slice.

Alternatively, the RPS is required to have bit stream conformance that if TemporalId of the current slice is not 0 or an NAL unit type of the current slice is one of TRAIL_N, TSA_N, STSA_N, RADL_N and RASL_N, and one or more reference pictures having the same POC LSB are present in the DPB, at least one of which is an LTRP, all LTRPs necessarily exist or must be contained in the RPS of the current slice.

According to the present embodiment, information for calculating or inferring an MSB of a POC of 256 is signaled when marking a picture with a POC of 268.

Ninth Embodiment

According to a ninth embodiment of the present invention, MSB information for calculating a POC of a specific LTRP needs to be present when the following situations are satisfied.

The present embodiment is applied under the situations that reference pictures for a previous picture which has TemporalId equal to 0 and is not discardable without affecting decodability of other pictures in the same temporal layer, that is, has an NAL unit type being none of TRAIL_N, TSA_N and STSA_N, include at least one reference picture having the same POC LSB as POC LSB of an LTRP for a current picture.

Here, the following mandate or restriction is applied.

A previous picture in decoding order which has an NAL unit type being none of TRAIL_N, TSA_N, STSA_N, RSV_VCL_N10, RSV_VCL_N12 and RSV_VCL_N14 and has TemporalId equal to 0 is set as "prevTid0Pic."

A previous picture POC set (setOfPreviousPictures) including POCs relating to prevTid0Pic are set to include all pictures present in an RPS of prevTid0Pic and all pictures following prevTid0Pic and preceding the current picture in decoding order.

delta_poc_msb_present_flag[i] shall be equal to 1 when there is more than one picture in setOfPreviousPictures with picture order count modulo MaxPicOrderCntLsb equal to PocLsbLt[i].

That is, when prevTid0Pic and setOfPreviousPictures are set as above and a reference picture with a specific condition is present, delta_poc_msb_present_flag[i] is 1, delta_poc_msb_cycle_lt[i] for determining DeltaPocMsb- CycleLt used for calculating a POC MSB of an LTRP of the current picture is signaled to the decoding apparatus.

According to the present embodiment, the marking process is not changed except that the foregoing mandate or restriction is added, and the encoding apparatus may need to comply with the mandate or restriction.

According to the present embodiment, information for calculating or inferring an MSB of a POC of 256 is signaled when marking a picture with a POC of 268.

Here, RSV_VCL_N10, RSV_VCL_N12 or RSV_VCL_N14 refers to a VCL NAL unit type reserved for a sub-layer non-reference picture, not an intra random access point.

The sub-layer non-reference picture is a picture that cannot be used for inter prediction in decoding process a subsequent picture in decoding order in the same sub-layer. A picture having an NAL unit type of TRAIL_N, TSA_N, STSA_N, RADL_N, RASL_N, RSV_VCL_N10, RSV_VCL_N12 or RSV_VCL_N14 is a sub-layer non-reference picture.

Tenth Embodiment

A tenth embodiment of the present invention is applied under the following situations.

The present embodiment is applied under the situations that when one or more reference pictures with the same POC LSB as a POC LSB (PocLsbLt[i]) of an LTRP of the current picture are present in the DPB, starting from a next picture to a first picture following a current picture in decoding order and having TemporalId equal to 0 and an NAL unit type being none of TRAIL_N, TSA_N, STSA_N, RSV_VCL_N10, RSV_VCL_N12 and RSV_VCL_N14.

Here, the following mandate or restriction is applied.

When one or more reference pictures with POC modulo MaxPicOrderCntLsb equal to PocLsbLt[i] are present in the DPB, delta_poc_msb_present_flag[i] for an LTRP having a POC LSB the same as PocLsbLt [i] is 1 for all sequence pictures following the current picture in decoding order until and including a first picture following the current picture in decoding order and having TemporalId equal to 0 and an NAL unit type being none of TRAIL_N, TSA_N, STSA_N, RADL_N, RASL_N, RSV_VCL_N10, RSV_VCL_N12 and RSV_VCL_N14.

According to the present embodiment, the marking process is not changed except that the foregoing mandate or restriction is added, and the encoding apparatus may need to comply with the mandate or restriction.

According to the present embodiment, information for calculating or inferring an MSB of a POC of 256 is signaled when marking a picture with a POC of 268.

Eleventh Embodiment

An eleventh embodiment of the present invention is a variation of the ninth embodiment.

According to the present embodiment, MSB information for calculating a POC of a specific LTRP needs to be present when the following situations are satisfied.

The present embodiment is applied under the conditions that reference pictures of a previous picture which has TemporalId equal to 0 and is not discardable without affecting decodability of other pictures in the same temporal layer, that is, has an NAL unit type not being any one of TRAIL_N, TSA_N and STSA_N, include at least one reference picture having the same POC LSB as POC LSB of an LTRP for a current picture.

Here, the following mandate or restriction is applied.

Let "prevTid0Pic" be a previous picture in decoding order which has an NAL unit type being none of TRAIL_N, TSA_N, STSA_N, RSV_VCL_N10, RSV_VCL_N12 and RSV_VCL_N14 and has TemporalId equal to 0 and let setOfPreviousPictures be the set consisting of all pictures present in an RPS of prevTid0Pic and all pictures following prevTid0Pic and preceding the current picture in decoding order.

delta_poc_msb_present_flag[i] is 1 when one or more pictures with POC modulo MaxPicOrderCntLsb equal to PocLsbLt[i] are present in setOfPreviousPictures.

Alternatively, prevTid0Pic is a previous picture in decoding order which has an NAL unit type being none of TRAIL_N, TSA_N, STSA_N, RADL_N, RASL_N, RASL_R, RSV_VCL_N10, RSV_VCL_N12 and RSV_VCL_N14 and TemporalId equal to 0.

SetOfPreviousPictures is set to include prevTid0Pic, all pictures present in the RPS of prevTid0Pic, and all pictures present in an RPS of all pictures following prevTid0Pic and preceding the current picture in decoding order.

delta_poc_msb_present_flag[i] is 1 when one or more pictures with POC modulo MaxPicOrderCntLsbg equal to PocLsbLt[i] are present in setOfPreviousPictures.

According to the present embodiment, the marking process is not changed except that the foregoing mandate or restriction is added, and the encoding apparatus may need to comply with the mandate or restriction.

According to the present embodiment, information for calculating or inferring an MSB of a POC of 256 is signaled when marking a picture with a POC of 268.

Twelfth Embodiment

A twelfth embodiment of the present invention is a variation of the ninth embodiment.

According to the present embodiment, MSB information for calculating a POC of a specific LTRP needs to be present when the following situations are satisfied.

The present embodiment is applied under the situations that reference pictures of a previous picture that has TemporalId equal to 0 and is not discardable without affecting decodability of other pictures in the same temporal layer include at least one reference picture having the same POC LSB as that of an LTRP for a current picture.

That is, the present embodiment may be applied when one or more reference pictures having the same POC LSB as POC LSB of the LTRP for the current picture are present in a case where the previous picture has an NAL unit type being none of TRAIL_N, TSA_N and STSA_N and has TemporalId equal to 0. Here, the following mandate or restriction is applied.

A previous picture in decoding order which has TemporalId equal to 0 and cannot be discarded without affecting decodability of other pictures is set as "prevTid0Pic."

For example, prevTid0Pic refers to a picture in decoding order which has an NAL unit type being none of TRAIL_N, TSA_N, STSA_N, RADL_N, RASL_N, RASL_R, RSV_VCL_N10, RSV_VCL_N12 and RSV_VCL_N14 and TemporalId equal to 0.

prevTid0Pic is not an RASL, RADR or sub-layer non-reference picture which can be discarded without affecting decodability of other pictures.

setOfPreviousPictures is set to include a POC of prevTid0Pic, a POC of each picture present in an RPS of prevTid0Pic, and a POC of each picture following prevTid0Pic and preceding the current picture in decoding order.

Alternatively, setOfPreviousPictures may be set to include a POC of prevTid0Pic, POCs of all pictures present in the RPS of prevTid0Pic and POCs of all pictures present in an RPS for all pictures following prevTid0Pic and preceding the current picture in decoding order.

Alternatively, setOfPreviousPictures may be set to include POCs of all pictures present in the RPS of prevTid0Pic and POCs of all pictures following prevTid0Pic and preceding the current picture in decoding order.

delta_poc_msb_present_flag[i] is 1 when one or more pictures with POC modulo MaxPicOrderCntLsb equal to PocLsbLt[i] are present in setOfPreviousPictures.

According to the present embodiment, the marking process is not changed except that the foregoing mandate or restriction is added, and the encoding apparatus may need to comply with the mandate or restriction.

According to the present embodiment, information for calculating or inferring an MSB of a POC of 256 is signaled when marking a picture with a POC of 268.

Thirteenth Embodiment

A thirteenth embodiment of the present invention is a variation of the tenth embodiment.

When one or more pictures with POC modulo MaxPicOrderCntLsb equal to PocLsbLt[i] are present in the DPB, delta_poc_msb_present_flag[i] is 1 for a current picture and for all sequence pictures following the current picture until and including a first picture following the current picture in decoding order and having TemporalId equal to 0 and an NAL unit type being none of TRAIL_N, TSA_N, STSA_N, RADL_N, RASL_N, RSV_VCL_N10, RSV_VCL_N12 and RSV_VCL_N14.

If PicOrderCnt(currPic) & (MaxPicOrderCntLsb−1) is equal to PicOrderCnt(picX) & (MaxPicOrderCntLsb−1) for any reference picture picX in the DPB, delta_poc_msb_present_flag[i] is 1 for all sequence pictures following the current picture in decoding order until and including the first picture following the current picture in decoding order and having TemporalId equal to 0 and an NAL unit type being none of TRAIL_N, TSA_N, STSA_N, RADL_N, RASL_N, RSV_VCL_N10, RSV_VCL_N12 and RSV_VCL_N14.

According to the present embodiment, the marking process is not changed except that the foregoing mandate or restriction is added, and the encoding apparatus may need to comply with the mandate or restriction.

According to the present embodiment, information for calculating or inferring an MSB of a POC of 256 is signaled when marking a picture with a POC of 268.

Fourteenth Embodiment

A fourteenth embodiment of the present invention is a variation of the thirteenth embodiment.

When one or more picture with POC modulo MaxPicOrderCntLsb equal to PocLsbLt[i] are present in the DPB, delta_poc_msb_present_flag[i] is 1 for a current picture and for all sequence pictures following the current picture until and including a first picture following the current picture in decoding order and having TemporalId of 0 and an NAL unit type being none of TRAIL_N, TSA_N, STSA_N, RADL_N, RASL_N, RSV_VCL_N10, RSV_VCL_N12 and RSV_VCL_N14.

If PicOrderCnt(currPic) & (MaxPicOrderCntLsb−1) is equal to PocLsbLt[i], delta_poc_msb_present_flag[i] is 1 for all sequence pictures following the current picture in decoding order until and including the first picture following the current picture in decoding order and having TemporalId equal to 0 and an NAL unit type being none of TRAIL_N, TSA_N, STSA_N, RADL_N, RASL_N, RSV_VCL_N10, RSV_VCL_N12 and RSV_VCL_N14.

According to the present embodiment, the marking process is not changed except that the foregoing mandate or restriction is added, and the encoding apparatus may need to comply with the mandate or restriction.

According to the present embodiment, information for calculating or inferring an MSB of a POC of 256 is signaled when marking a picture with a POC of 268.

Fifteenth Embodiment

A fifteenth embodiment of the present invention is a variation of the twelfth embodiment.

According to the present embodiment, MSB information for calculating a POC of a specific LTRP needs to be present when the following situations are satisfied.

The present embodiment is applied under the situations that at least one reference picture having the same POC LSB as that of an LTRP for a current picture is present with respect to a reference picture of a previous picture named prevKeyPicture, which has TemporalId equal to 0 and is not discardable without affecting other pictures in the same temporal layer ID, prevKeyPicture itself, and all pictures following prevKeyPicture and preceding the current picture in decoding order.

That is, the present embodiment may be applied when at least one reference picture having the same POC LSB as that of the LTRP for the current picture is present in a case where the previous picture has an NAL unit type being none of TRAIL_N, TSA_N and STSA_N and TemporalId equal to 0.

Here, the following mandate or restriction is applied.

A previous picture in decoding order which has an NAL unit type being none of TRAIL_N, TSA_N, STSA_N, RADL_N, RASL_N, RASL_R, RSV_VCL_N10, RSV_VCL_N12 and RSV_VCL_N14 and TemporalId equal to 0 is set as "prevTid0Pic."

setOfPreviousPictures is set to include PicOrderCntVal of prevTid0Pic, PicOrderCntVal of each picture present in an RPS of prevTid0Pic, and PicOrderCntVa of each picture following prevTid0Pic and preceding the current picture in decoding order.

Here, a picture having an NAL unit type which is none of TRAIL_N, TSA_N, STSA_N, RADL_N, RASL_N, RASL_R, RSV_VCL_N10, RSV_VCL_N12 and RSV_VCL_N14 may also be expressed as picture that is neither a sub-layer non-reference picture nor a RASL picture.

According to the present embodiment, the marking process is not changed except that the foregoing mandate or restriction is added, and the encoding apparatus may need to comply with the mandate or restriction.

According to the present embodiment, information for calculating or inferring an MSB of a POC of 256 is signaled when marking a picture with a POC of 268.

Sixteenth Embodiment

A sixteenth embodiment of the present invention is a variation of the fifteenth embodiment.

According to the present embodiment, MSB information for calculating a POC of a specific LTRP needs to be present when the following situations are satisfied.

The present embodiment is applied under the situations that reference pictures of a previous picture having TemporalId equal to 0 and an NAL unit type not discardable without affecting decodability of other pictures in the same temporal layer, that is, the NAL unit type being none of TRAIL_N, TSA_N and STSA_N, include at least one reference picture having the same POC LSB as that of an LTRP of a current picture.

Here, the following mandate or restriction is applied.

prevTid0Pic, which represents a previous picture at a front position in decoding order having TemporalId equal to 0, has an NAL unit type being none of TRAIL_N, TSA_N, STSA_N, RADL_N, RASL_N, RASL_R, RSV_VCL_N10, RSV_VCL_N12 and RSV_VCL_N14 and has TemporalId equal to 0.

setOfPreviousPictures is set to include PicOrderCntVal of prevTid0Pic, PicOrderCntVal of each picture present in an RPS of prevTid0Pic, and PicOrderCntVal of each picture following prevTid0Pic and preceding the current picture in decoding order as a non-reference picture having TemporalId being not the same as HighestTid.

delta_poc_msb_present_flag[i] is 1 when one or more pictures with POC modulo MaxPicOrderCntLsb equal to PocLsbLt[i] are present in setOfPreviousPictures.

Here, a picture having an NAL unit type being none of TRAIL_N, TSA_N, STSA_N, RADL_N, RASL_N, RASL_R, RSV_VCL_N10, RSV_VCL_N12 and RSV_VCL_N14 may also be expressed as picture that is neither a sub-layer non-reference picture nor RASL picture.

According to the present embodiment, the marking process is not changed except that the foregoing mandate or restriction is added, and the encoding apparatus may need to comply with the mandate or restriction.

According to the present embodiment, information for calculating or inferring an MSB of a POC of 256 is signaled when marking a picture with a POC of 268.

Figure 11:
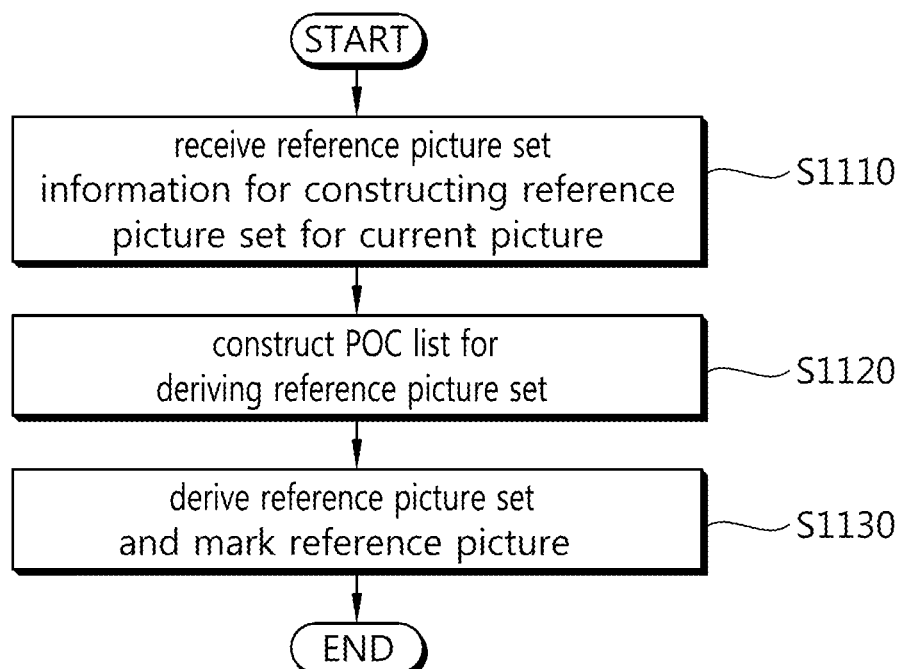
FIG. 11 is a flowchart illustrating a process of deriving an RPS and marking a picture according to the present invention.

FIG. 11 is a flowchart illustrating a process of deriving an RPS and marking a picture according to the present invention.

The decoding apparatus receives RPS information for constructing an RPS of a current picture (S1110).

The RPS information may include information on a number of STRPSs, index information on an STRPS of the current picture, and POC difference information for calculating POCs of STRPs forming the STRPS.

Further, the RPS information may include flag information indicating existence of an LTRP, information on a number of LTRPs, index information on an STRP of the current picture, information on an LSB of an LTRP, MSB information for calculating an MSB of a POC of an LTRP, and flag information indicating whether MSB information is present, that is, MSB information is received. The RPS information may be received in a bit stream relating to an SPS, PPS or slice header.

The MSB information on the LTRP is received only when the flag information indicating existence of MSB information, for example, delta_poc_msb_present_flag, is 1.

The MSB information may be MSB cycle information for determining a value corresponding to a difference in POC MSB between the current picture and the LTRP, for example, DeltaPocMsbCycleLt, and be signaled with a syntax element, for example, delta_poc_msb_cycle_lt.

The difference in POC MSB between the current picture and the LTRP derived corresponding to a signaled value of delta_poc_msb_cycle_lt may be derived as DeltaPocMsbCycleLt for first and last LTRPs that is the signaled value of delta_poc_msb_cycle_lt.

DeltaPocMsbCycleLt[i] for an i-th LTRP, other than the first and last LTRPs, may be derived as a sum of signaled delta_poc_msb_cycle_lt[i] and DeltaPocMsbCycleLt[i−1] for a previous LTRP.

Here, the MSB information on the LTRP may be present when a specific condition is satisfied. That is, delta_poc_msb_present_flag of 1 is signaled under the specific condition.

When a previous picture that has a temporal sub-layer ID (TemporalId) equal to 0 and cannot be discarded without affecting decodability of other pictures in the same temporal sub-layer is set as prevTid0Pic, a previous picture POC set, setOfPrevPocVals, including POCs relating to prevTid0Pic may be constructed.

the previous picture prevTid0Pic has an NAL unit type of not equal to one of TRAIL_N, TSA_N, STSA_N, RADL_N, RASL_N, RSV_VCL_N10, RSV_VCL_N12 and RSV_VCL_N14.

Alternatively, the previous picture prevTid0Pic may not be a sub-layer non-reference picture not used for inter prediction in the decoding process of subsequent pictures of the same sub-layer in decoding order.

The previous picture POC set setOfPrevPocVals may include a POC of the previous picture, a POC of each reference picture in an RPS of the previous picture, and a POC of each picture following the previous picture in decoding order and preceding the current picture in decoding order.

To sum up, according to the present invention, the MSB information for calculating the MSB of the POC of the LTRP for the current picture is signaled when the previous picture POC set includes at least one POC having the same LSB as that of the LTRP for the current picture, that is, reference pictures for the previous picture include a reference picture having the same LSB as that of the LTRP for the current picture.

Here, the previous picture is a picture which has TemporalId equal to 0 and cannot be discarded without affecting decodability of other pictures in the same temporal sub-layer.

Referring to FIG. 6, even though Pic 267 is removed, if a previous picture POC set constructed for a previous picture Pic 266 includes a reference picture having the same POC LSB as that of the LTRP for the current picture, delta_poc_msb_present_flag of 1 is signaled for Pic 268. Thus, an LTRPS for Pic 268 may be normally derived.

After receiving and parsing the RPS information, the decoding apparatus constructs a POC list for deriving the RPS (S1120).

The POC list may include an STRP POC list including POCs of STRPs of the current picture and an LTRP POC list including POCs of LTRPs of the current picture.

The STRP POC list may include a forward STRP POC list PocStCurrBefore, a backward STRP POC list PocStCurrAfter, and a non-reference STRP POC list PocStFoll.

The LTRP POC list may include an LTRP POC list PocLtCurr used by the current picture and an LTRP POC list PocLtFoll not used by the current picture.

An STRP POC forming the POC list is generated using a difference in POC between the current picture and an STRP. That is, POCs of reference pictures included in the STRP POC list may be determined based on relative POCs. Here, information on the relative POCs may be transmitted from the encoding apparatus to the decoding apparatus.

A relative POC may represent a POC difference between two pictures in an RPS. Relative POCs of reference pictures before the current picture in POC order, that is, reference pictures having a smaller POC than that of the current picture, may correspond to POC differences from reference pictures right before the reference pictures in the RPS. Relative POCs of reference pictures after the current picture in POC order, that is, reference pictures having a greater POC than that of the current picture, may correspond to POC differences from reference pictures right before the reference pictures in the RPS.

In the forward STRP POC list, forward STRPs having a smaller POC that that of the current picture may be disposed in descending order of POCs. That is, pictures having a smaller POC than that of the current picture among pictures in the DPB may be disposed in descending order of POCs from a start of the forward STRP POC list.

In the backward STRP POC list, backward STRPs having a greater POC that that of the current picture may be disposed in ascending order of POCs. That is, pictures having a greater POC than that of the current picture among the pictures in the DPB may be disposed in ascending order of POCs from a start of the backward STRP POC list.

An STRP may be included in PocStFoll or PocStCurrBefore/PocStCurrAfter corresponding to information indicating whether the STRP is used by the current picture, such as used_by_curr_pic_s0_flag or used_by_curr_pic_s1_flag.

Meanwhile, a POC of an LTRP is generated by an operation that is POC of current picture−DeltaPocMsbCycleLt*MaxPicOrderCntLsb−POC LSB of current picture+POC LSB of LTRP. Here, DeltaPocMsbCycleLt has a value corresponding to a difference in POC MSB between the current picture and the LTRP.

Figure 12:
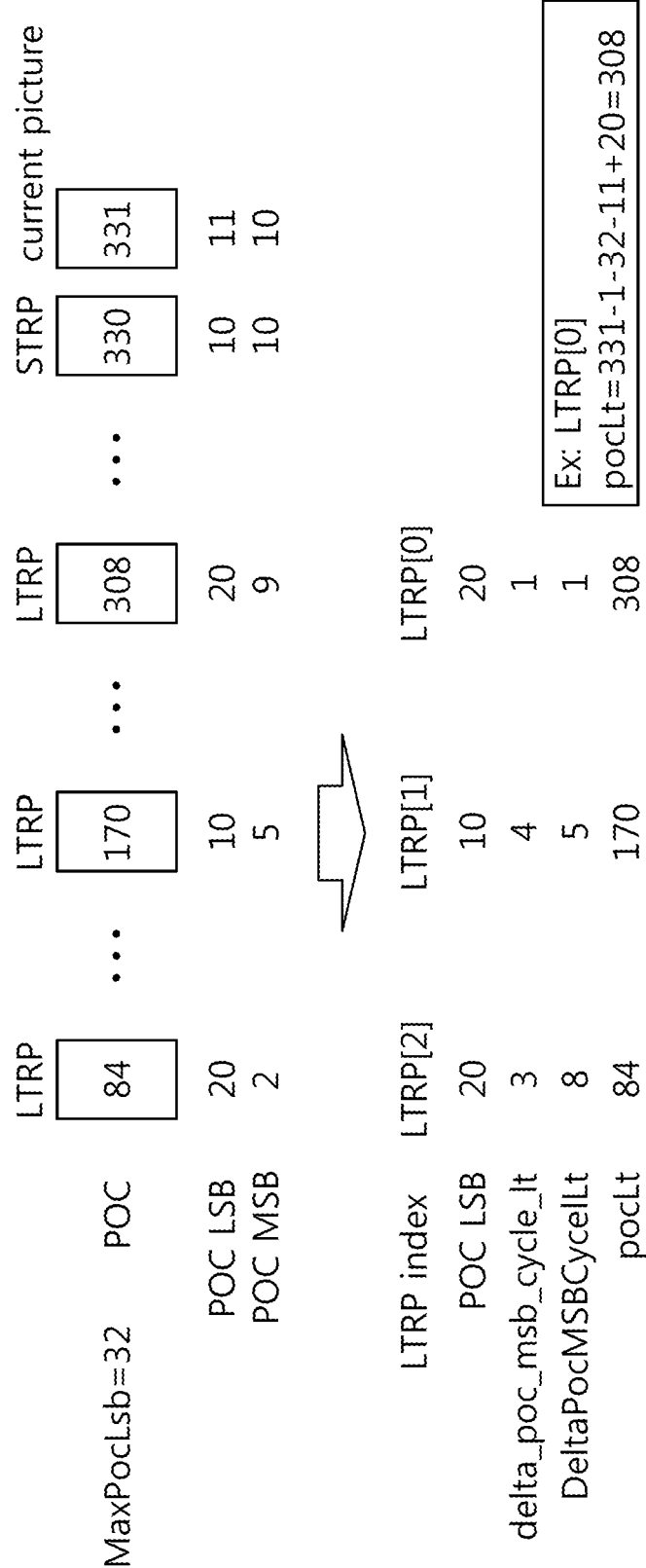
FIG. 12 illustrates a method of deriving a picture order count (POC) of a long-term reference picture (LTRP).

FIG. 12 illustrates a method of deriving a POC of an LTRP.

As shown in FIG. 12, an LTRP has a great POC difference from the current picture and thus may be expressed using a POC LSB and a POC MSB.

MaxPocLsb refers to a maximum LSB value. For example, if MaxPocLsb is 32, an LTRP (LTRF) with a POC of 84 may be expressed as 32*2+20, in which LSB is 20 and MSB is 2.

The current picture with a POC of 338 may be expressed as 32*10+11 when a maximum value expressed in LSB is 32, in which MSB is 10 and LSB is 11.

delta_poc_msb_cycle_lt is a value for determining a POC MSB, that is, DeltaPocMsbCycleLt, in an LTRPS of the current picture. DeltaPocMsbCycleLt may correspond to a difference in POC MSB between the current picture and a reference picture.

A POC of an LTRP may be derived using a POC LSB of the reference picture and a difference in POC MSB between the current picture and the reference picture.

For example, when the current picture has a POC of 331, an LTRP with a POC of 308 indexed to 0, LTRP[0], may be expressed as 331−1*32−11+20 using an LSB of the LTRP of 20 and a difference in POC MSB between the current picture and the LTRP equal to 1.

Similarly, an LTRP with a POC of 170 indexed to 1, LTRP[1], may be expressed as 331−5*32−11+10 using an LSB of the LTRP of 10 and a difference in POC MSB between the current picture and the LTRP equal to 5.

An LTRP may be included in PocLtFoll or PocLtCurr corresponding to information indicating whether the reference picture is used by the current picture, such as used_by_curr_pic_lt_flag.

When the POC list is generated, the RPS is derived using the POC list, and a reference picture is marked (S1130).

If a picture with POC LSB or POC equal to a POC in the LTRP POC list is present in the DPB storing a reconstructed picture, the decoding apparatus includes the picture in an LTRPS RefPicSetLtCurr or RefPicSetLtFoll.

If a picture with POC LSB or POC equal to the POC in the LTRP POC list is not present in the DPB, the RPS includes "no reference picture," that is, no reference picture is present in an entry.

All pictures in the LTRPS are marked as "used for long-term reference."

Subsequently, if a picture with POC equal to a POC in the STRP POC list, the decoding apparatus includes the picture in an STRPS.

If a picture with the same POC as the POC in the STRP POC list is not present in the DPB, the RPS includes "no reference picture," that is, no reference picture is present in an entry.

All pictures in the DBP not included in the LTRPS and STRPS are marked as "unused for reference." The picture marked as "unused for reference" may be removed from the DPB.

According to the present invention, in marking a reference picture, reference pictures in the POC list are marked as "unused for reference" or "used for long-term reference."

Figure 13:
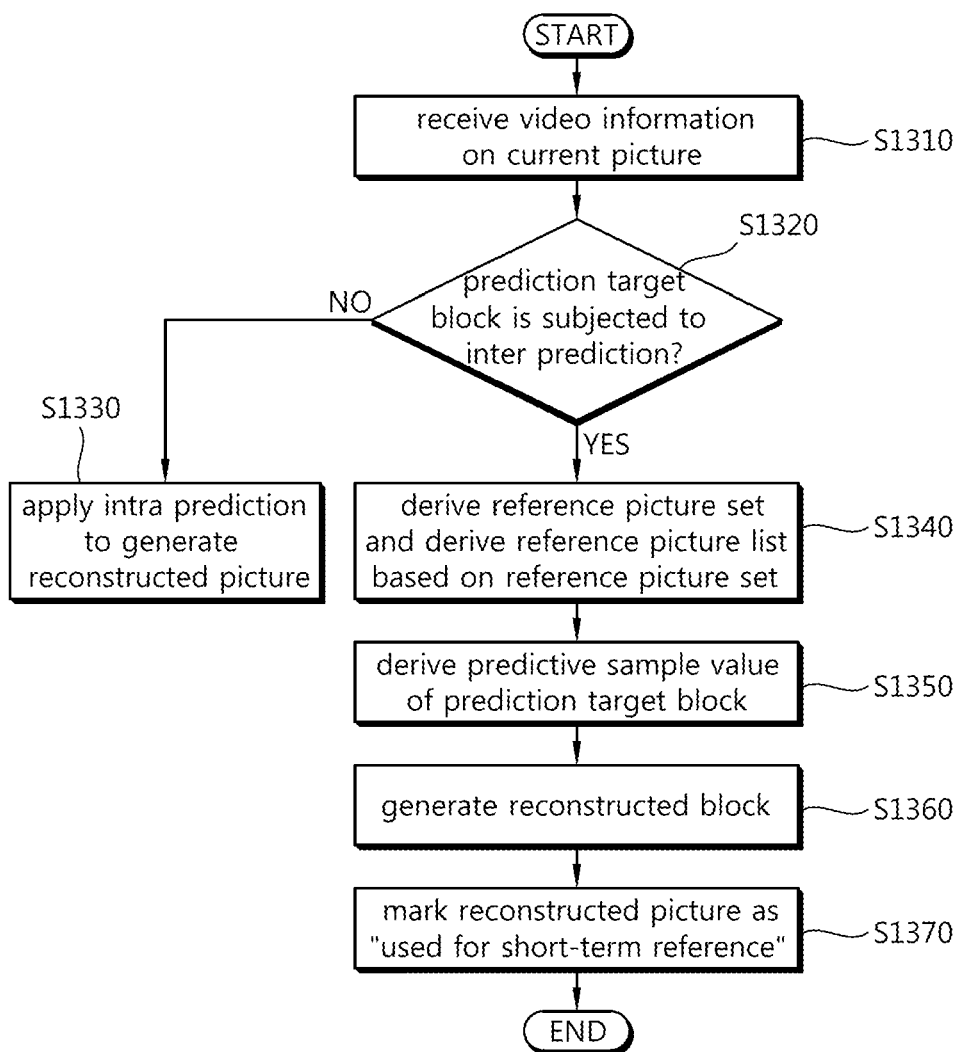
FIG. 13 is a flowchart illustrating a video decoding method according to the present invention.

FIG. 13 is a flowchart illustrating a video decoding method according to the present invention.

First, the decoding apparatus receives information on a video, such as slice type information on a current picture, RPS information for constructing an RPS of the current picture and prediction mode information on the current picture (S1310).

The decoding apparatus determines based on the prediction mode information whether a prediction target block is subjected to intra prediction or inter prediction (S1320).

If intra prediction is applied to the prediction target block, the decoding apparatus generates a reconstructed picture via a process of deriving an intra prediction mode and a process of generating a prediction block (S1330).

If inter prediction is applied to the prediction target block, the decoding apparatus derives an RPS and derives a reference picture list based on the RPS (S1340). The RPS is derived when a first slice of the current picture is not an IDR picture. A process of deriving the RPS and marking a picture is substantially the same as that illustrated in FIG. 11, and thus description thereof is omitted herein.

A process of constructing the reference picture list to be illustrated below may be considered as a process of initializing the reference picture list.

When reference picture list L0 is constructed, the decoding apparatus may sequentially allocate reference picture indices to forward STRPs forming a forward STRPS, backward STRPs forming a backward STRPS and LTRPs forming an LTRPS, thereby constructing the reference picture list. That is, in L0, the forward STRPs may be allocated, the backward STRPs may be added, and then the LTRPs may be finally added.

The forward STRPs forming the forward STRPS may be added to L0 in the same order as included in the forward STRPS. That is, the forward STRPs may be disposed in descending order of POCs in L0, and a greater reference index value may be allocated to a picture with a smaller POC.

The backward STRPs forming the backward STRPS may be added to L0 in the same order as included in the backward STRPS. That is, the backward STRPs may be disposed in ascending order of POCs in L0, and a greater reference index value may be allocated to a picture with a greater POC.

In addition, the LTRPs forming the LTRPS may be added to L0 in the same order as included in the LTRPS.

For a B slice, reference picture list L1 may be also generated in addition to L0. When L1 is constructed, the decoding apparatus may sequentially allocate reference picture indices to the backward STRPs forming the backward STRPS, the forward STRPs forming the forward STRPS and the LTRPs forming the LTRPS, thereby constructing the reference picture list. That is, in L1, the backward STRPs may be allocated, the forward STRPs may be added, and then the LTRPs may be finally added.

The backward STRPs forming the backward STRPS may be added to L1 in the same order as included in the backward STRPS. That is, the backward STRPs may be disposed in ascending order of POCs in L1, and a greater reference index value may be allocated to a picture with a greater POC.

The forward STRPs forming the forward STRPS may be added to L1 in the same order as included in the forward STRPS. That is, the forward STRPs may be disposed in descending order of POCs in L1, and a greater reference index value may be allocated to a picture with a smaller POC. In addition, the LTRPs forming the LTRPS may be added to L1 in the same order as included in the LTRPS.

The reference pictures added to L0 and L1 may be sequentially allocated reference picture indices.

A number of reference pictures to be included in the RPS may be determined based on information transmitted from the encoding apparatus. For instance, the encoding apparatus may construct a reference picture list, determine a number of reference pictures to use, and transmit information on the number of reference pictures to use, for example, num_ref_idx_lX_default_active_minus1, X=0 or 1, as a syntax element of a sequence parameter set (SPS) to the decoding apparatus. The decoding apparatus may use a number of reference pictures specified by a value of num_ref_idx_lX_default_active_minus1 plus 1 as a default in a current sequence.

Further, to specify a number of reference pictures by each picture or slice, the encoding apparatus may transmit extra information indicating a number of reference pictures, for example, num_ref_idx_l1_active_minus1, X=0 or 1, through a picture parameter set (PPS) or slice header. The decoding apparatus may adopt a value of num_ref_idx_l1_active_minus1 plus 1 as a number of reference pictures for a current picture or current slice.

In the foregoing process, the reference picture lists may be considered to be implicitly derived. When the reference picture lists are implicitly derived, the encoding apparatus and the decoding apparatus may derive the reference picture lists available for inter prediction of the current picture based on the POCs of the pictures as described above.

Meanwhile, the decoding apparatus may modify the implicitly derived reference picture lists based on information explicitly transmitted from the encoding apparatus. Here, the encoding apparatus may transmit both reference picture list modification information indicating that the implicitly derived reference picture lists are modified and entry information indicating a specific entry forming the reference picture lists. When the reference picture lists are modified based on the information explicitly transmitted from the encoding apparatus to be finally specified, the reference picture lists may be considered to be explicitly specified.

When L0 is explicitly specified, the encoding apparatus may transmit entry information on L0. The entry information on L0 may indicate a reference picture corresponding to an index on L0. When L1 is explicitly specified, the encoding apparatus may transmit entry information on L1. The entry information on L1 may indicate a reference picture corresponding to an index on L1.

For example, when the reference picture lists are explicitly specified by the entry information, order and/or reference picture indices of the forward STRPs, the backward STRPs and the LTRPs in the reference picture lists may be different from those in the implicitly derived reference picture lists. Furthermore, when the reference picture lists are specified by the entry information, available reference pictures to be utilized may be different from those in the implicitly derived reference pictures lists.

When the reference picture lists are explicitly specified, the decoding apparatus may construct the same reference picture lists as those constructed by the encoding apparatus based on the reference picture list modification information and the entry information.

In the foregoing method of implicitly deriving the reference picture lists, the RPS and the reference picture list are illustrated only considering available pictures for convenience of description, but an RPS and/or a reference picture list may be also constructed by the encoding apparatus and the decoding apparatus in view of whether reference pictures are available or used.

When the reference picture list is derived, the decoding apparatus derives a predictive sample value of the prediction target block using the reference picture list (S1350) and generates a reconstructed picture based on the predictive sample value (S1360).

Subsequently, the decoding apparatus marks the reconstructed picture as "used for short-term reference" (S1370).

According to the present invention, the reconstructed picture is marked as "used for short-term reference" after the reconstructing process, and is newly marked with respect to whether the picture is used as an LTRP and used as a reference picture by the process of deriving the RPS and marking the picture when decoding a next picture.

Although methods of illustrative systems have been described with a series of stages or blocks based on the flowcharts, the present invention is not limited to the foregoing sequence of the stages. Some stages may be carried out in different order from described above or at the same time. Further, it should be noted that as the aforementioned embodiments may include various aspects of examples, combinations of the embodiments may be also understood as exemplary embodiments of the present invention. Thus, it will be appreciated by those skilled in the art that changes, modifications and alternatives may be made in these exemplary embodiments without departing from the principles and spirit of be the invention, the scope of which is defined in the appended claims and their equivalents.

The invention claimed is:

1. A video decoding method, by a decoding apparatus, the method comprising:
  receiving reference picture set (RPS) information, wherein the RPS information comprises flag information related to whether most significant bit (MSB) information for calculating an MSB of a picture order count (POC) of a long-term reference picture (LTRP) for a current picture is present, and wherein the RPS information further comprises the MSB information based on a case that a value of the flag information is equal to 1, wherein the value of the flag information is equal to 1 based on a case that there is more than one POC value, in a previous picture POC set, for which the POC value modulo MaxPicOrderCntLsb is equal to a least significant bit (LSB) of the POC of the LTRP, MaxPicOrderCntLsb is a predetermined max least significant bit value, wherein the previous picture POC set is derived based on a previous picture of the current picture in decoding order, and the previous picture has a temporal sub-layer identifier equal to 0, and wherein the previous picture POC set derived based on the previous picture of the current picture includes 1) a POC of each reference picture in an RPS for the previous picture in decoding order, and 2) a POC of each picture following the previous picture in decoding order and preceding the current picture in decoding order;

deriving an RPS for the current picture based on the MSB information based on a case that the value of the flag information is equal to 1;

performing inter prediction for a block in the current picture based on the RPS; and reconstructing the current picture based on the result of the inter prediction, wherein the flag information and the MSB information are configured in a slice header.

2. The method of claim 1, wherein the previous picture cannot be discarded without affecting decodability of another picture in the same temporal layer, and wherein the previous picture has a network abstraction layer (NAL) unit type not equal to TRAIL_N, TSA_N, STSA_N, RADL_N, RASL_N, RASL_R, RSV_VCL_N10, RSV_VCL_N12, or RSV_VCL_N14.

3. The method of claim 1, wherein the previous picture is not a sub-layer non-reference picture which is not used for inter prediction in the decoding process of subsequent pictures of the same sub-layer in decoding order.

4. The method of claim 1, wherein the previous picture POC set further include a POC of the previous picture.

5. The method of claim 1, wherein the MSB information is MSB cycle information determining a value corresponding to a difference in POC MSB between the current picture and the LTRP.

6. The method of claim 1, further comprising constructing a POC list for deriving the RPS, wherein the POC list comprises a short-term reference picture (STRP) POC list comprising a POC of an STRP for the current picture and an LTRP POC list comprising the POC of the LTRP for the current picture, the STRP POC list is generated using a difference in POC between the current picture and the STRP, and the LTRP POC list is generated by an operation that is POC of current picture—DeltaPocMsbCycleLt* MaxPicOrderCntLsb —POC LSB of current picture +POC LSB of LTRP, DeltaPocMsbCycleLt having a value corresponding to a difference in POC MSB between the current picture and the LTRP.

7. The method of claim 6, wherein the deriving the RPS comprises:

constructing an LTRP set using a picture with a POC LSB or POC equal to a POC in the LTRP POC list based on a case that there is the picture in a decoded picture buffer (DPB) storing a reconstructed picture;

marking all pictures in the LTRP set as "used for long-term reference;"

constructing an STRP set using a picture with a POC equal to a POC in the STRP POC list based on a case that there is the picture in the DBP; and marking all reference pictures in the DPB which are not included on the LTRP set and the STRP set as "unused for reference."

8. The method of claim 1, wherein the reconstructed current picture is marked as "used for short-term reference."

9. A video encoding method, by an encoding apparatus, the method comprising:

deriving reference picture set (RPS) information, wherein the RPS information comprises flag information related to whether most significant bit (MSB) information for calculating an MSB of a picture order count (POC) of a long-term reference picture (LTRP) for a current picture is present, and wherein the RPS information further comprises the MSB information based on a case that a value of the flag information is equal to 1, wherein the value of the flag information is equal to 1 based on a case that there is more than one POC value, in a previous picture POC set, for which the POC value modulo MaxPicOrderCntLsb is equal to a least significant bit (LSB) of the POC of the LTRP, MaxPicOrderCntLsb is a predetermined max least significant bit value, wherein the previous picture POC set is derived based on a previous picture of the current picture in decoding order, and the previous picture has a temporal sub-layer identifier equal to 0, and wherein the previous picture POC set derived based on the previous picture of the current picture includes 1) a POC of each reference picture in an RPS for the previous picture in decoding order, and 2) a POC of each picture following the previous picture in decoding order and preceding the current picture in decoding order; and generating a bitstream by encoding video information including the RPS information, wherein the flag information and the MSB information are configured in a slice header.

10. The method of claim 9, wherein the previous picture cannot be discarded without affecting decodability of another picture in the same temporal layer, and wherein the previous picture has a network abstraction layer (NAL) unit type not equal to TRAIL_N, TSA_N, STSA_N, RADL_N, RASL_N, RASL_R, RSV_VCL_N10, RSV_VCL_N12, or RSV_VCL_N14.

11. The method of claim 9, wherein the previous picture is not a sub-layer non-reference picture which is not used for inter prediction in the decoding process of subsequent pictures of the same sub-layer in decoding order.

12. The method of claim 9, wherein the previous picture POC set further include a POC of the previous picture.

13. The method of claim 9, wherein the MSB information is MSB cycle information determining a value corresponding to a difference in POC MSB between the current picture and the LTRP.

14. The method of claim 9, further comprising constructing a POC list for deriving the RPS, wherein the POC list comprises a short-term reference picture (STRP) POC list comprising a POC of an STRP for the current picture and an LTRP POC list comprising the POC of the LTRP for the current picture, the STRP POC list is generated using a difference in POC between the current picture and the STRP, and the LTRP POC list is generated by an operation that is POC of current picture—DeltaPocMsbCycleLt* MaxPicOrderCntLsb —POC LSB of current picture +POC LSB of LTRP, DeltaPocMsbCycleLt having a value corresponding to a difference in POC MSB between the current picture and the LTRP.

15. The method of claim 14, wherein the deriving the RPS comprises:
   constructing an LTRP set using a picture with a POC LSB or POC equal to a POC in the LTRP POC list based on a case that there is the picture in a decoded picture buffer (DPB) storing a reconstructed picture;
   marking all pictures in the LTRP set as "used for long-term reference;"
   constructing an STRP set using a picture with a POC equal to a POC in the STRP POC list based on a case that there is the picture in the DBP; and
   marking all reference pictures in the DPB which are not included on the LTRP set and the STRP set as "unused for reference."

16. A non-transitory decoder-readable storage medium storing a bitstream generated by performing the steps of: deriving reference picture set (RPS) information, wherein the RPS information comprises flag information related to whether most significant bit (MSB) information for calculating an MSB of a picture order count (POC) of a long-term reference picture (LTRP) for a current picture is present, and wherein the RPS information further comprises the MSB information based on a case that a value of the flag information is equal to 1; and generating the bitstream by encoding video information including the RPS information,
   wherein the value of the flag information is equal to 1 based on a case that there is more than one POC value, in a previous picture POC set, for which the POC value modulo MaxPicOrderCntLsb is equal to a least significant bit (LSB) of the POC of the LTRP, MaxPicOrderCntLsb is a predetermined max least significant bit value, wherein the previous picture POC set is derived based on a previous picture of the current picture in decoding order, and the previous picture has a temporal sub-layer identifier equal to 0, and
   wherein the previous picture POC set derived based on the previous picture of the current picture includes 1) a POC of each reference picture in an RPS for the previous picture in decoding order, and 2) a POC of each picture following the previous picture in decoding order and preceding the current picture in decoding order; and
   wherein the flag information and the MSB information are configured in a slice header.

* * * * *